United States Patent
Wise et al.

(10) Patent No.: US 12,460,673 B2
(45) Date of Patent: Nov. 4, 2025

(54) FORCE COUPLING ASSEMBLIES AND RELATED SYSTEMS AND METHODS

(71) Applicant: US Synthetic Corporation, Orem, UT (US)

(72) Inventors: Daryl Wise, Provo, UT (US); Tyler Kolste, American Fork, UT (US); Jair Gonzalez, Provo, UT (US)

(73) Assignee: US SYNTHETIC CORPORATION, Orem, UT (US)

( * ) Notice: Subject to any disclaimer, the term of this patent is extended or adjusted under 35 U.S.C. 154(b) by 542 days.

(21) Appl. No.: 17/884,501

(22) Filed: Aug. 9, 2022

(65) Prior Publication Data

US 2023/0052737 A1 Feb. 16, 2023

Related U.S. Application Data

(63) Continuation-in-part of application No. 17/401,030, filed on Aug. 12, 2021, now Pat. No. 12,188,526.

(51) Int. Cl.
| | | |
|---|---|---|
| *F16C 33/04* | (2006.01) | |
| *E21B 4/00* | (2006.01) | |
| *F16C 17/06* | (2006.01) | |
| *F16C 33/26* | (2006.01) | |

(52) U.S. Cl.
CPC ............ *F16C 33/043* (2013.01); *E21B 4/003* (2013.01); *F16C 17/06* (2013.01); *F16C 33/26* (2013.01); *F16C 2202/04* (2013.01); *F16C 2206/56* (2013.01); *F16C 2206/58* (2013.01); *F16C 2352/00* (2013.01)

(58) Field of Classification Search
CPC ........ F16C 33/043; F16C 17/06; F16C 33/26; F16C 2202/04; F16C 2206/56; F16C 2206/58; F16C 2352/00; E21B 4/003

USPC ........................................................ 464/152
See application file for complete search history.

(56) References Cited

U.S. PATENT DOCUMENTS

| | | |
|---|---|---|
| 2,109,935 A | 3/1938 | Thomas |
| 3,478,523 A | 11/1969 | Reusser et al. |
| 3,887,248 A | 6/1975 | Riegler |
| 4,029,368 A | 6/1977 | Tschirky et al. |
| 4,080,014 A | 3/1978 | Riegler et al. |
| 4,141,605 A | 2/1979 | Riordan et al. |
| 4,190,301 A | 2/1980 | Lachonius et al. |
| 4,410,054 A | 10/1983 | Nagel et al. |

(Continued)

FOREIGN PATENT DOCUMENTS

| | | |
|---|---|---|
| RU | 2044176 | 9/1995 |
| RU | 107299 | 8/2011 |

(Continued)

OTHER PUBLICATIONS

Rhenium"Tooling Solutions for Harsh Working Conditions" Hunan Rhenium Alloy Material Co retrieved from the internet Feb. 8, 2024 at https:www.rheniumet.com/product/tooling-solutions . (Year: 2022).

(Continued)

*Primary Examiner* — Greg Binda
(74) *Attorney, Agent, or Firm* — BKRIP LLC

(57) ABSTRACT

Force coupling or torque coupling assemblies, apparatuses, systems, and methods include assemblies that each include superhard contact elements. At least some of the superhard contact elements may be configured to remain in contact with each other when a rotational force and/or a thrust force is applied between the assemblies.

20 Claims, 13 Drawing Sheets

(56) References Cited

U.S. PATENT DOCUMENTS

| | | |
|---|---|---|
| 4,560,014 A | 12/1985 | Geczy |
| 4,720,199 A | 1/1988 | Geczy et al. |
| 4,738,322 A | 4/1988 | Hall et al. |
| 4,756,631 A | 7/1988 | Jones |
| 4,914,865 A | 4/1990 | Wiand et al. |
| 5,267,398 A | 12/1993 | Hall |
| 7,552,782 B1 | 6/2009 | Sexton et al. |
| 7,866,418 B2 | 1/2011 | Bertagnolli et al. |
| 7,870,913 B1 | 1/2011 | Sexton et al. |
| 7,901,137 B1 | 3/2011 | Peterson |
| 7,934,776 B2 | 5/2011 | de Andrade et al. |
| 8,210,747 B2 | 7/2012 | Cooley et al. |
| 8,312,631 B2 | 11/2012 | Sexton |
| 8,613,554 B2 | 12/2013 | Tessier et al. |
| 8,678,657 B1 | 3/2014 | Knuteson |
| 8,708,564 B2 | 4/2014 | Cooley et al. |
| 8,814,434 B1 | 8/2014 | Sexton |
| 9,562,562 B2 | 2/2017 | Paterson |
| D888,788 S | 6/2020 | Kolste |
| 11,054,000 B2 | 7/2021 | Prevost et al. |
| 11,661,972 B2 | 5/2023 | Lu |
| 2007/0046119 A1 | 3/2007 | Cooley |
| 2009/0008892 A1 | 1/2009 | Gaumer |
| 2010/0226759 A1 | 9/2010 | Cooley et al. |
| 2010/0237621 A1 | 9/2010 | Tessier |
| 2010/0288558 A1 | 11/2010 | Sexton |
| 2011/0024198 A1 | 2/2011 | Dick et al. |
| 2011/0192648 A1 | 8/2011 | Baudoin |
| 2012/0039551 A1 | 2/2012 | Cooley |
| 2012/0057814 A1 | 3/2012 | Dadson |
| 2012/0281938 A1 | 11/2012 | Peterson et al. |
| 2012/0321232 A1 | 12/2012 | Cooley |
| 2012/0325560 A1 | 12/2012 | Sexton |
| 2013/0004106 A1 | 1/2013 | Wenzel |
| 2013/0170778 A1 | 7/2013 | Higginbotham et al. |
| 2015/0043849 A1 | 2/2015 | Peterson |
| 2019/0136628 A1 | 5/2019 | Savage |
| 2021/0222734 A1 | 7/2021 | Gonzalez |

FOREIGN PATENT DOCUMENTS

| | | |
|---|---|---|
| WO | 2015184022 A1 | 12/2015 |
| WO | 2016172577 A1 | 10/2016 |
| WO | WO2020028189 A1 | 2/2020 |
| WO | 2020131421 A2 | 6/2020 |

OTHER PUBLICATIONS

Office Action dated Feb. 14, 2024 for U.S. Appl. No. 17/401,030, 10 pages.
Office Action dated Jun. 18, 2024 for U.S. Appl. No. 17/401,030, 9 pages.
Written Opinion for PCT/US2022/039881, Dec. 5, 2022, 8 pages.
International Search Report for PCT/US2022/039881, Dec. 5, 2022, 4 pages.

FORCE COUPLING ASSEMBLIES AND RELATED SYSTEMS AND METHODS

CROSS REFERENCE TO RELATED APPLICATIONS

This application is a continuation in part of U.S. patent application Ser. No. 17/401,030, titled "TORQUE COUPLING ASSEMBLIES AND RELATED SYSTEMS AND METHODS," filed Aug. 12, 2021, now U.S. Pat. No. 12,188,526, the disclosure of which is incorporated herein in its entirety by reference.

TECHNICAL FIELD

This application relates to force coupling assemblies (e.g., torque coupling assemblies) including superhard contact elements and related systems and methods.

BACKGROUND

Coupling mechanisms or assemblies are commonly used in a variety of mechanical applications. For example, subterranean drilling systems, turbomachinery, hydroelectric plants, windmills, cranes, turbine generators, pumps, automotive parts or component, marine propulsion components, and power plant machinery may utilize coupling assemblies to couple a driven shaft to other componentry (e.g., other shafts, tools, etc.).

As one example, a subterranean drilling system may include one or more coupling assemblies that are operably coupled to an output shaft of the downhole drilling motor for distributing forces or loads (e.g., torque coupling between rotating components) generated during drilling operations. The output shaft may be coupled to one or more additional components (e.g., including the motor) that require force couplings that can withstand the torque applied by the motor. Further, in extreme environments, such as in a borehole, the caustic and/or corrosive conditions may require that the force couplings be sealed from environmental elements, such as from the drilling fluid used during a downhole operation. Further, other industrial processes and/or machinery involve the use of caustic fluids, abrasive fluids, and/or acidic fluids. These types of fluids may increase the amount of wear on the movable components of a system. The increased wear may result in increased maintenance and repair costs or require the early replacement of equipment.

During drilling operations or other operations involving one or more rotating components, such as shafts, the output shaft that transfers rotational torque from a motor to a drill bit or other tool or component may be deflected at various angles relative to the axis of rotation. Over time, such repeated deflection of the output shaft may apply additional forces and loads to force couplings attached to the output shaft as the force couplings and/or the shaft become displaced from a central axis about which the shaft is rotating.

SUMMARY

Embodiments of the instant disclosure may be directed to force coupling assemblies, systems, and methods. According to some embodiments, a torque coupling assembly may include an inner assembly comprising an inner support ring positioned circumferentially about an inner ring axis and a first plurality of superhard contact elements coupled to the inner support ring, where each of the first plurality of superhard contact elements have a superhard contact surface. The torque coupling assembly may further include an outer assembly comprising an outer support ring positioned circumferentially about an outer ring axis and a second plurality of superhard contact elements coupled to the outer support ring, where each of the second plurality of superhard contact elements have a superhard contact surface. The superhard contact surface of at least one of the second plurality of superhard contact elements is configured to contact and transfer a torque to a respective superhard contact surface of at least one of the first plurality of superhard contact elements when a rotational force is applied between the inner assembly and the outer assembly.

According to some embodiments, a force coupling assembly may include a first assembly comprising a first support structure positioned circumferentially around a first structure axis and one or more contact elements coupled to the first support structure, where the one or more contact elements each have a superhard contact surface. The force coupling assembly may further include a second assembly comprising a second support structure positioned circumferentially around a second structure axis and one or more contact elements coupled to the second support structure, where the one or more contact elements each have a superhard contact surface. The superhard contact surface of each of the one or more contact elements coupled to the second support structure oppose a respective one of the one or more contact elements coupled to the first support structure. The superhard contact surface of at least one of the one or more contact elements coupled to the second support structure is configured to engage with and remain substantially stationary relative to a respective one or more contact elements coupled to the first support structure when a force is applied between the first assembly and the second assembly.

According to some embodiments a method of transfer torque between components of a rotating system includes applying torque to a shaft in order to rotate the shaft about an axis of rotation; and transferring the torque to another component coupled to the shaft with at least one torque coupling assembly. The transferring the torque comprises applying the torque through a first ring coupled to the shaft, the first ring having one or more superhard coupling elements coupled to the first ring and transferring the torque from the first ring through the one or more superhard coupling elements coupled to the first ring to one or more superhard coupling elements coupled to a second ring that is coupled to the another component. The method further includes rotating the another component with the transferred torque.

In some aspects, the techniques described herein relate to a torque coupling assembly, including: an inner assembly including an inner support ring positioned about an inner ring axis; an outer assembly including an outer support ring positioned about an outer ring axis; superhard contact elements coupled to the inner support ring and the outer support ring, superhard contact surfaces of the superhard contact elements configured to transfer a torque via at least some of the superhard contact elements between the inner assembly and the outer assembly when a rotational force is applied to the torque coupling assembly; and one or more thrust bearing elements including additional superhard contact elements, the additional superhard contact elements positioned and configured to support the torque coupling assembly when an axial loading is applied between the inner assembly and the outer assembly in a direction at least partially along at least one of the inner ring axis or the outer ring axis.

In some aspects, the techniques described herein relate to a force coupling assembly, including: an inner assembly including an inner support ring positioned about an inner ring axis; an outer assembly including an outer support ring positioned about an outer ring axis; superhard contact elements coupled to the inner support ring and the outer support ring, superhard contact surfaces of the superhard contact elements configured to transfer a torque via at least some of the superhard contact elements between the inner assembly and the outer assembly when a rotational force is applied to torque coupling assembly; and one or more thrust bearing elements configured to transfer a thrust force applied between the inner assembly and the outer assembly in a direction at least partially along at least one of the inner ring axis or the outer ring axis.

In some aspects, the techniques described herein relate to a rotary motion system, including: a shaft; a rotational energy device configured to apply torque to the shaft in order to rotate the shaft; and at least one force coupling assembly including the force coupling assembly operably coupled to the shaft and another component, the at least one force coupling assembly configured to transfer at least some of the torque applied to the shaft by the rotational energy device to the another component of the system via the at least one force coupling assembly, the at least one force coupling assembly further configured to receive a thrust force via the shaft or the another component with the one or more thrust bearing elements.

In some aspects, the techniques described herein relate to a method of transfer one or more between components of a rotating system, the method including: applying a torque to a shaft in order to rotate the shaft about an axis of rotation; transferring the torque to another component coupled to the shaft with a torque coupling assembly, the transferring the torque including: applying the torque through a first ring coupled to the shaft, the first ring having one or more superhard coupling elements coupled to the first ring; and transferring the torque from the first ring through the one or more superhard coupling elements coupled to the first ring to one or more superhard coupling elements coupled to a second ring that is coupled to the another component; and rotating the another component with the torque; and supporting a thrust force applied between the first ring and the second ring with one or more additional superhard coupling elements.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

DETAILED DESCRIPTION

Figure 1:
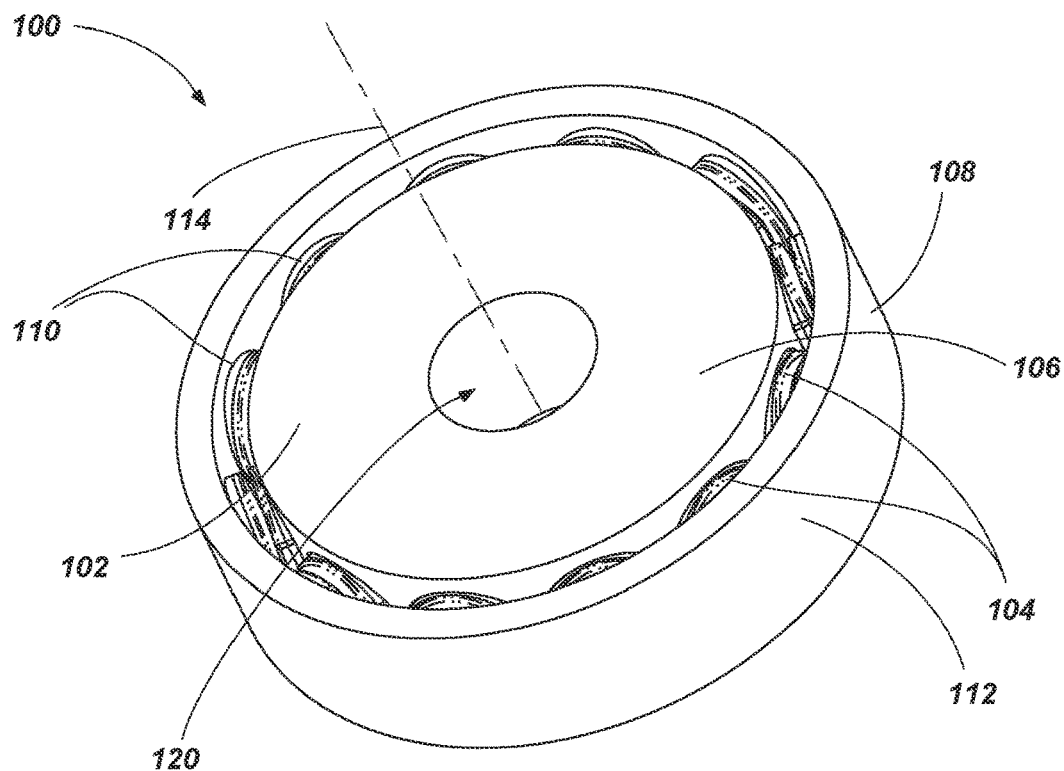
FIG. 1 is a perspective view of a force coupling assembly according to an embodiment of the disclosure.

Embodiments of the instant disclosure are directed to force coupling assemblies and force coupling assemblies (e.g., torque coupling assemblies) including superhard contact elements. The force coupling assemblies may be configured to transfer a load between components (e.g., to transfer torque between two or more laterally or radially arranged rings). In some embodiments, the force coupling assemblies may include one or more bearing elements providing thrust force (e.g., axial loadings) bearing surfaces.

Such force coupling assemblies may be used in a variety of applications, including subterranean drilling systems, directional drilling systems, turbine generators, windmills, cranes, machinery, pumps, mixers, automotive and marine components, and any other suitable applications, without limitation.

The terms "superhard," as used herein, may refer to any material having a hardness of known superhard materials, for example, a hardness that is at least equal to a hardness of tungsten carbide. For example, a superhard article may represent an article of manufacture, at least a portion of which may exhibit a hardness that is equal to or greater than the hardness of tungsten carbide.

As used herein, relational terms, such as "first," "second," "top," "bottom," etc., are generally used for clarity and convenience in understanding the disclosure and accompanying drawings and do not connote or depend on any specific preference, orientation, or order, except where the context clearly indicates otherwise.

As used herein, the term "and/or" means and includes any and all combinations of one or more of the associated listed items.

As used herein, the terms "vertical," "lateral," and "radial" refer to the orientations as depicted in the figures.

As used herein, the term "substantially" or "about" in reference to a given parameter means and includes to a degree that one skilled in the art would understand that the given parameter, property, or condition is met with a small degree of variance, such as within acceptable manufacturing tolerances. For example, a parameter that is substantially met may be at least 90% met, at least 95% met, at least 99% met, or even 100% met.

Wear-resistant, superhard materials may be utilized for contact elements utilized in force coupling assemblies. The force coupling assembly may include structures positioned in opposition (e.g., an inner structure and an outer structure at least partially receiving the inner structure, such as concentric rings) that are each configured to accept a number of superhard contact elements. In some embodiments, each superhard contact element may include a polycrystalline diamond compact (PDC) having one or more polycrystalline diamond (PCD) layers formed on a substrate, such as a cemented tungsten carbide substrate. However, as discussed above and below, other superhard materials may be implemented. In some embodiments, the structures formed as rings defining the force coupling assembly may be annular rings or other polygonal shaped rings.

One or more superhard contact elements may be attached to the rings by press-fitting, brazing, or through other suitable methods of attachment. Contact elements attached to one of the rings may have superhard contact surfaces configured and oriented radially outward to contact opposing superhard contact surfaces of contact elements attached to the other ring, for example, where the other ring at least partially radially surrounds the first ring.

In use, at least some of the superhard contact surfaces of contact elements of the rings may interact (e.g., are placed in contact) in order to substantially secure the rings relative to each other (e.g., such that the rings exhibit little to no movement relative to each other). As the rings remain in contact, forces (e.g., torque) may be transmitted between the rings. Such force may be utilized to couple a force applied to a first component to a second component of a system or assembly. For example, the rings of the force coupling assembly may couple a torque applied to a first rotating component (e.g., by a motor) to a second component in order to rotation the second component.

Figure 2:
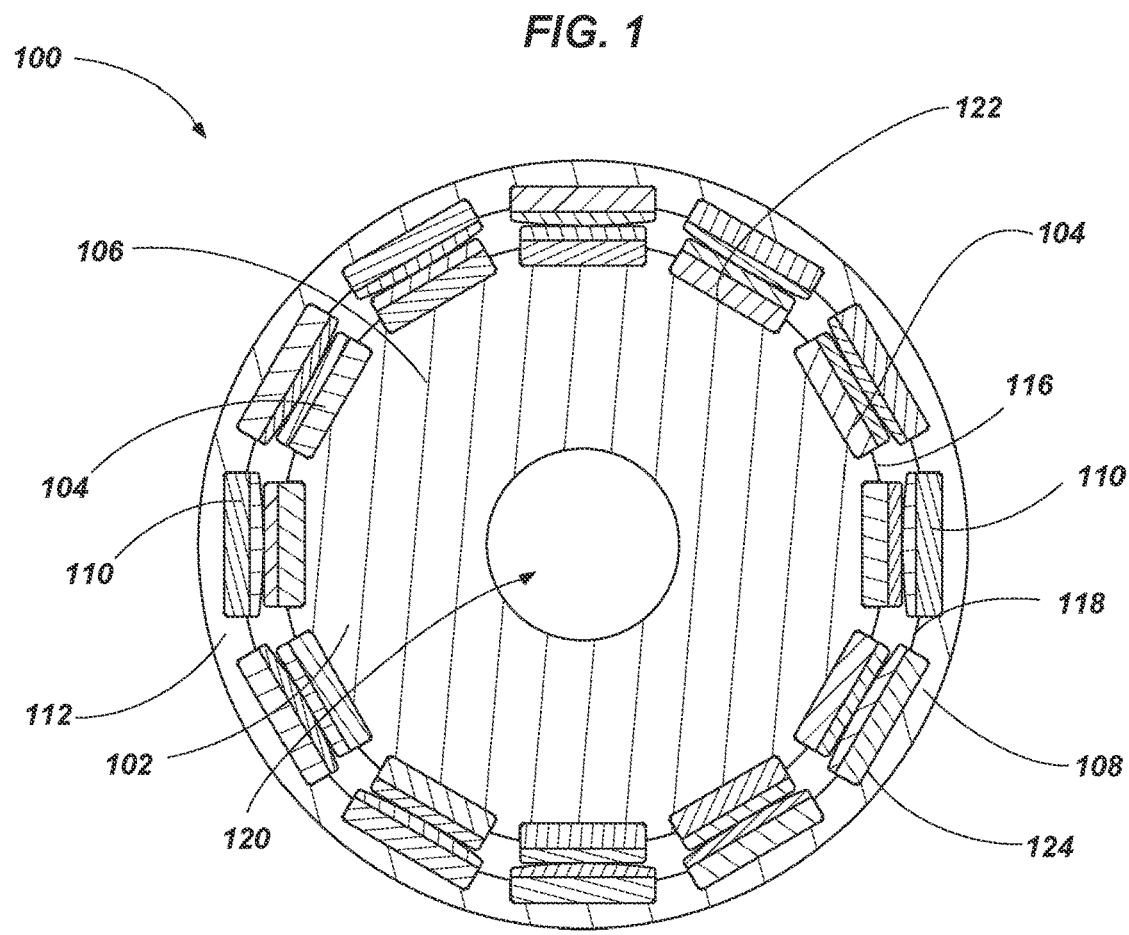
FIG. 2 is a cross-sectional view of the force coupling assembly shown in FIG. 1.

FIG. 1 is a perspective view of a force coupling assembly 100 (e.g., in a radially opposing configuration to transfer rotational energy, such as, for example, torque, in any applied direction, for example, positive or counterclockwise torque, negative or clockwise torque, combinations thereof) and FIG. 2 is a cross-sectional view of the force coupling assembly 100. As illustrated in FIGS. 1 and 2, the force coupling assembly 100 may be configured to primarily transfer forces or loads (e.g., torque) between the structures of the force coupling assembly 100. For example, the force coupling assembly 100 may be configured to transfer force where a majority of the force is transferred through the force coupling assembly 100 via contact between first force coupling assembly 102 and second force coupling assembly 108 (e.g., in response to forces applied in a lateral or radial direction to either/both of first force coupling assembly 102 and second force coupling assembly 108).

As depicted, force coupling assembly 100 may comprise a first force coupling assembly 102 (e.g., an inner structure or assembly) having contact elements 104 (e.g., superhard contact elements) coupled to a first support structure 106 and arranged about a central point or inner axis. The contact elements 104 may be positioned in the first support structure 106 at a substantially similar or the same angle relative to the inner axis. For example, centerlines of the contact elements 104 may each be set at a direction transverse to the inner axis (e.g., substantially perpendicular to). In additional embodiments, the centerlines of the contact elements 104 may be set at an oblique angle relative to the inner axis where the contact element may also at least partially support forces along the inner axis (e.g., axial loadings).

Force coupling assembly 100 may additionally comprise a second force coupling assembly 108 (e.g., an outer structure or assembly) having contact elements 110 (e.g., superhard contact elements) coupled to a second support structure 112 and arranged about a central point or axis. As depicted, a portion of the first support structure 106 of the first force coupling assembly 102 may be received in the second support structure 112 of the second force coupling assembly 108. The contact elements 110 may be positioned in the second support structure 112 at a substantially similar or the same oblique angle relative to the inner axis, such as, for example, at complementary angles to the angles discussed above in relation to the contact elements 104 (e.g., substantially perpendicular to the inner axis or at an oblique angle relative thereto).

As depicted, the support structures 106, 112 may be annular (e.g., rings, ovals, etc.) or may comprise polygonal shapes, or other suitable shapes, without limitation.

In some embodiments, first force coupling assembly 102 and second force coupling assembly 108 may be configured to remain generally stationary relative to one another (e.g., during loading). For example, while some movement between the first force coupling assembly 102 and the second force coupling assembly 108 may occur during initial loading (e.g., during the start of rotary motion), the first force coupling assembly 102 and the second force coupling assembly 108 may remain generally stationary once the forces increase to a selected amount (e.g., once the contact elements 104 are adequately engaged with the contact elements 110 in order to effectively transfer torque between the contact elements 104, 110. In some embodiments, the first force coupling assembly 102 and the second force coupling assembly 108 may initially rotate relative to each other only a limited magnitude of degrees or less (e.g., less than 1 degree, less than 2 degrees, less than 3 degrees, less than 4 degrees, or less than 5 degrees) during loading. For example, the first force coupling assembly 102 and the second force coupling assembly 108 may initially rotate relative to each other less than 1 degree to 15 degrees, less than a quarter of a circle, a minor portion of a circle (e.g., less than 180 degrees), etc.

In some embodiments, the first force coupling assembly 102 and the second force coupling assembly 108 may initially rotate up to a full relative revolution (e.g., less than a full rotation) between the assemblies 102, 108. For example, where the contact elements 104, 110 are positioned only on one radial side of a respective support structure 106, 112, the first force coupling assembly 102 and the second force coupling assembly 108 may initially rotate until the contact elements 104, 110 are engaged with each other.

Regardless of the amount of relative rotation, the contact elements 104, 110 are configured to eventually engage in a generally stationary configuration (e.g., not moving relative to each other) under contact loading where forces may be applied between the contact elements 104, 110 (e.g., under a rotational force or moment).

First force coupling assembly 102 and second force coupling assembly 108 may each be arranged circumferentially around a central axis (e.g., longitudinal axis 114). The longitudinal axis 114 may comprise a rotational axis about which first force coupling assembly 102 and second force coupling assembly 108 engage rotationally. However, a rotational axis of first force coupling assembly 102 and second force coupling assembly 108 may not be aligned with longitudinal axis 114 at all times during operation. For example, during operation, second force coupling assembly 108 may be circumferentially centered about a longitudinal axis 114 while the first force coupling assembly 102 is circumferentially centered about and/or rotates about an axis that is oriented at an angle (and/or slightly misaligned) with respect to the longitudinal axis 114.

First support structure 106 may comprise an outer surface 116 facing radially outward that opposes an inner surface 118 of the second support structure 112 that faces radially inward with respect to the longitudinal axis 114.

Force coupling assembly 100 may include a central aperture 120 defined the first support structure 106 and/or the second support structure 112 that may receive a shaft (e.g., a motor shaft or a pump shaft). As depicted, aperture 120 may be generally centered about longitudinal axis 114.

First support structure 106 may be configured to receive one or more contact elements 104 (e.g., at least one including a superhard material) that may each be attached within a corresponding recess 122 defined in first support structure 106. Second support structure 112 may also be configured to receive one or more contact elements 110 (e.g., at least one including a superhard material) that may each be attached within a corresponding recess 124 defined in second support structure 112. Each contact element 104 may be flush with or may extend beyond outer surface 116 of first support structure 106 by a selected distance. Similarly, each contact element 110 may be flush with or may extend beyond inner surface 118 of second support structure 112 by a selected distance. Each of contact elements 104 and contact elements 110 may be fixedly secured within a corresponding recess 122, 124, respectively, through brazing, press-fitting, threaded attachment, pin attachment, bonding, frictional engagement, and/or by any other suitable attachment mechanism or structure, combinations thereof, without limitation.

Any suitable number of contact elements 104 and contact elements 110 may be secured, respectively, to first support structure 106 and second support structure 112 (e.g., one or more elements 104, 110). For example, contact elements 104 may each be secured within the corresponding recess 122 defined in first support structure 106 while a similar or the same number of contact elements 110 may each be secured within the corresponding and complementary recess 124 defined in second support structure 112. First force coupling assembly 102 may comprise the same number or a different number of contact elements 104 in comparison with the number of contact elements 110 included in second force coupling assembly 108. Additionally, contact elements 104 may have substantially the same dimensions (e.g., diameters) and/or overall shape as contact elements 110 or different dimensions and/or overall shape than contact elements 110.

First support structure 106 and second support structure 112 may each be made from a variety of different materials. For example, first support structure 106 and/or second support structure 112 may comprise a metallic material (e.g., carbon steel, titanium or titanium alloys, tungsten or tungsten alloys, aluminum or aluminum alloys, or stainless steel, etc.), a carbide material (e.g., tungsten carbide, silicon carbide, etc.), or any other suitable material. In some embodiments, first support structure 106 and/or second support structure 112 may be made of a material with relatively high thermal conductivity (e.g., tungsten carbide or cobalt-cemented tungsten carbide). Contact elements 104, 110 may each abut or contact a respective support structure 106, 112 over a selected (e.g., a substantial) surface area of the contact element 104, 110.

In some embodiments, first support structure 106 and/or second support structure 112 may include an erosion-resistant and/or abrasion-resistant coating applied thereto. For example, an erosion-resistant and abrasion resistant coating may include a coating including, for example, a urethane rubber or other suitable coating, without limitation. In other embodiments, a hardfacing coating (e.g., tungsten carbide hardfacing) may be applied to first support structure 106 and/or second support structure 112 by any suitable method, including, without limitation, flame spraying, welding HVOF (high velocity oxy-fuel coating spraying), and/or laser cladding.

In some embodiments, contact elements 104 may be positioned and oriented on first support structure 106 and contact elements 110 may be positioned and oriented on second support structure 112 such that contact surfaces of contact elements 104 contact opposing contact surfaces of contact elements 110. When first force coupling assembly 102 and second force coupling assembly 108 are assembled together, contact surfaces of contact elements 104 and the opposing contact surfaces of contact elements 110 may bear against each other and may initially move relative to each other as first force coupling assembly 102 rotates relative to second force coupling assembly 108 until a selected amount of force is applied between the contact elements 104, 110. In some embodiments, the contact elements 104, 110 may be substantially fixed relative to each other such that no radial or axial movement may occur between the contact elements 104, 110.

As will be described in greater detail below, contact elements 104 and contact elements 110 may comprise various surface shapes and configurations for achieving desired contact and/or freedom/limitation of movement between opposing contact surfaces.

As noted above, an interface between the contact elements 104 and contact elements 110 may define an angle with respect to the longitudinal axis 114 (e.g., may be substantially parallel with the longitudinal axis 114). In some embodiments, the angle of the interface between the contact elements 104, 110 may be selected (e.g., greater than 0 degree and less than or substantially equal to 90 degrees) relative to the longitudinal axis 114.

Figure 3:
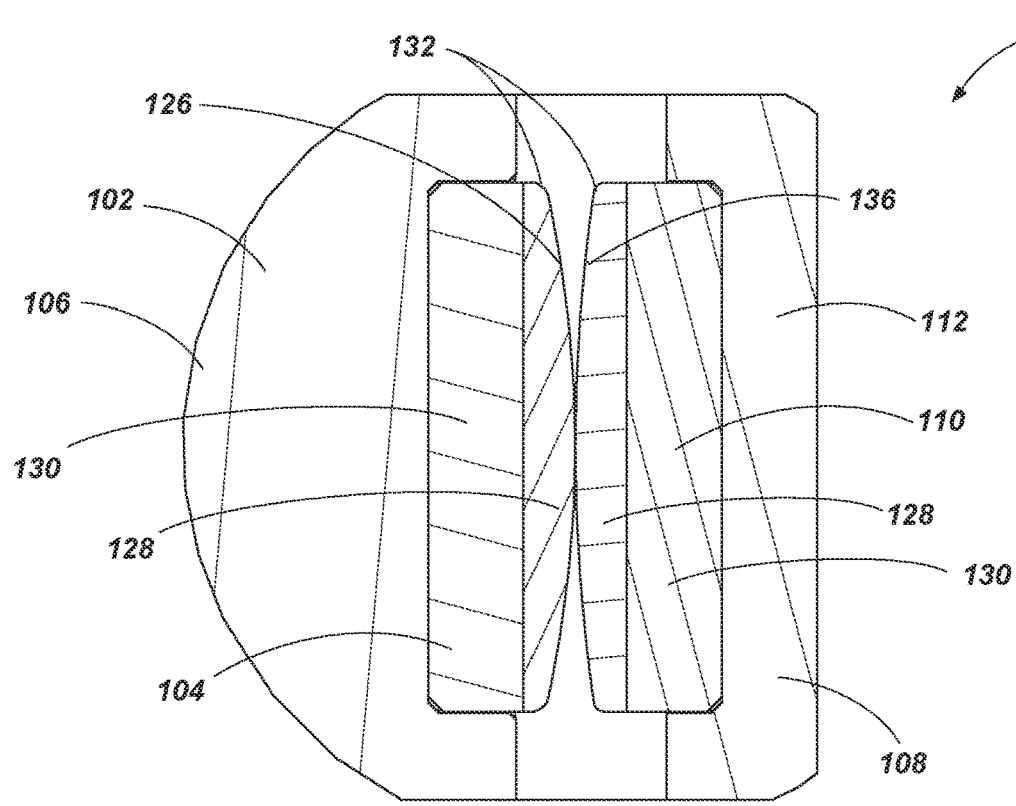
FIG. 3 is a cross-sectional view of a portion of a force coupling assembly according to an embodiment of the disclosure.

FIG. 3 is a cross-sectional view of a portion of a force coupling assembly 100 including contact elements 104, 110 on opposing support structures, respectively (e.g., the first force coupling assembly 102 and the second force coupling assembly 108 as shown in FIGS. 1 and 2).

As illustrated in FIG. 3, a portion of contact element 104 extending from or substantially flush with first support structure 106 may comprise a contact surface 126 (e.g., a superhard contact surface). The contact surface 126 may comprise any suitable shape, without limitation (e.g., a planar shape, a rounded or curved shape, combinations thereof, etc.). For example, contact surface 126 may comprise an at least partially rounded surface, such as a convex partial-cylindrical surface or partial-spherical surface. Further, in some embodiments, a portion of contact element 110 may comprise a contact surface 136 which at least partially corresponds to at least a portion of contact surface 126. In some embodiments, the contact surface 136 may exhibit a ramped, concave, or tapered shape portion with a central lower portion that extends along a diameter of the contact surface 136 and is bordered by two opposing higher portions positioned at two outer radial sections of the contact elements 110.

As depicted, the contact surface 126 may exhibit a curvature (e.g., a major or maximal curvature that is greater than zero) substantially with respect to a first reference only one axis (e.g., a radial axis extending through the center/centroid of the contact surface 126) as opposed to a spherical surface that exhibits a similar curvature with respect to more than one reference axis (e.g., more than one radial axis extending through the center/centroid of the contact surface 126) defined radial axis. With respect to another reference axis of the contact surface 126 that is transverse (e.g., perpendicular) to the first reference axis, curvature may be minimal (e.g., no) curvature (e.g., approaching or equal to zero). The contact elements 104 may each exhibit a ramped or tapered shape with a central higher portion that extends along a diameter of the contact surface 126 (e.g., from a first lateral side to a second opposing lateral side). The central higher portion (e.g., central curved portion) is bordered on opposing lateral sides by two opposing lower portions (e.g., two ramp portions) positioned at two outer lateral sections of the contact elements 104.

As further shown in FIG. 3, a portion of contact element 110 extending from or substantially flush with second support structure 112 may comprise a contact surface 136 (e.g., a superhard contact surface). The contact surface 136 of one or more of the contact elements 110 (e.g., each contact element 110) may comprise an at least partially rounded or ellipsoidal convex surface. For example, the contact surface 136 may comprise an at least partially convex rounded shape. In some embodiments, the contact surfaces 136 of the contact elements 110 may comprise a partially ellipsoidal surface, a partially cylindrical surface (e.g., a convex cylindrical surface), and/or partially spherical shape.

As depicted, contact surface 136 may comprise a convex, partially ellipsoidal or substantially partially ellipsoidal surface shape. For example, a cross-sectional view of contact element 110 taken along a plane parallel to the central element axis may have a convex, partially circular or substantially partially circular profile for contact surface 136 as shown in FIG. 3. In some embodiments, contact surface 136 may comprise a substantially partially spherical surface shape. In such embodiments, each cross-sectional view of contact element 110 taken along a plane intersecting a central element axis of the contact element 110 may have substantially the same or similar profile.

Contact elements 104, 110 may also include a chamfer 132 between a side surface and contact surfaces 126, 136. Chamfer 132 may comprise an angular, sloped, and/or rounded edge formed at the intersection of superhard side surface and contact surfaces 126, 136. Any suitable surface shape may be formed at the intersection of superhard side surface and contact surfaces 126, 136, such as those disclosed in U.S. Pat. No. 8,708,564, the disclosure of which is incorporated herein in its entirety by this reference. Any other suitable surface shape may also be formed at the intersection of superhard side surface and contact surfaces 126, 136, including, without limitation, an arcuate surface (e.g., a radius, an ovoid shape, or any other rounded shape), a sharp edge, multiple chamfers/radii, a honed edge, and/or combinations of the foregoing.

Contact elements 104, 110 may comprise any suitable size, shape, and/or geometry, without limitation. In some embodiments, the contact elements 104, 110 may have widths (e.g., diameters) of between 6 mm to 26 mm in a generally cylindrical shape or another shape (e.g., oval, polygonal, etc.). In some embodiments, the thickness of the superhard table 128 may be greater than 0.50 millimeters (e.g., 1 mm to 2 mm, 2 mm to 3 mm, 3 mm to 4 mm, or greater than 4 mm).

In some embodiments, contact elements 104, 110 may each comprise a superhard table 128 affixed to or formed upon a substrate 130. Where implemented, the substrate 130 of the contact elements 104, 110 may comprise any suitable material on which the superhard table 128 may be formed. In at least one embodiment, substrate 130 may comprise a cemented carbide material, such as a cobalt-cemented tungsten carbide material and/or any other suitable material. In some embodiments, substrate 130 may include a suitable metal-solvent catalyst material, such as, for example, cobalt, nickel, iron, and/or alloys thereof. Substrate 130 may also include any suitable material including, without limitation, carbides such as titanium carbide, tungsten carbide, niobium carbide, tantalum carbide, vanadium carbide, chromium carbide, and/or combinations of any of the preceding carbides cemented with iron, nickel, cobalt, and/or alloys thereof. Superhard table 128 may be formed of any suitable superabrasive and/or superhard material or combination of materials, including, for example, PCD. Any of the superhard tables disclosed herein may also comprise polycrystalline diamond materials, such as those disclosed in U.S. Pat. No. 7,866,418, the disclosure of which is incorporated herein, in its entirety, by this reference. According to additional embodiments, superhard table 128 may comprise cubic boron nitride, silicon carbide or nitride, polycrystalline diamond, diamond slugs, other carbides or nitrides (e.g., tungsten carbide) and/or mixtures or composites including one or more of the foregoing materials, without limitation.

Superhard table 128 of contact elements 104, 110 may be formed using any suitable technique. According to some embodiments, superhard table 128 may comprise a PCD table fabricated by subjecting a plurality of diamond particles to a high pressure, high temperature (HPHT) sintering process in the presence of a metal-solvent catalyst (e.g., cobalt, nickel, iron, or alloys thereof) to facilitate intergrowth between the diamond particles and form a PCD body comprised of bonded diamond grains that exhibit diamond-to-diamond bonding therebetween. For example, the metal-solvent catalyst may be mixed with the diamond particles, infiltrated from a metal-solvent catalyst foil or powder adjacent to the diamond particles, infiltrated from a metal-solvent catalyst present in a cemented carbide substrate, or combinations of the foregoing. The bonded diamond grains (e.g., sp3-bonded diamond grains), so-formed by HPHT sintering the diamond particles, define interstitial regions with the metal-solvent catalyst disposed within the interstitial regions of the as-sintered PCD body. The diamond particles may exhibit a selected diamond particle size distribution.

Following sintering, various materials, such as a metal-solvent catalyst, remaining in interstitial regions within the as-sintered PCD body may reduce the thermal stability of superhard table 128 at elevated temperatures. In some examples, differences in thermal expansion coefficients between diamond grains in the as-sintered PCD body and a metal-solvent catalyst in interstitial regions between the diamond grains may weaken portions of superhard table 128 that are exposed to elevated temperatures, such as temperatures developed during operation. The weakened portions of superhard table 128 may become excessively worn and/or damaged during operation.

Removing the metal-solvent catalyst and/or other materials from the as-sintered PCD body may improve the heat resistance and/or thermal stability of superhard table 128, particularly in situations where the PCD material may be exposed to elevated temperatures. A metal-solvent catalyst and/or other materials may be removed from the as-sintered PCD body using any suitable technique, including, for example, leaching. In at least one embodiment, a metal-solvent catalyst, such as cobalt, may be removed from regions of the as-sintered PCD body, such as regions adjacent to the working surfaces of superhard table 128. Removing a metal-solvent catalyst from the as-sintered PCD body may reduce damage to the PCD material of superhard table 128 caused by expansion of the metal-solvent catalyst.

At least a portion of a metal-solvent catalyst, such as cobalt, as well as other materials, may be removed from at least a portion of the as-sintered PCD body using any suitable technique, without limitation. For example, chemical and/or gaseous leaching may be used to remove a metal-solvent catalyst from the as-sintered PCD body up to a desired depth from a surface thereof. The as-sintered PCD body may be leached by immersion in an acid, such as aqua regia, nitric acid, hydrofluoric acid, or subjected to another suitable process to remove at least a portion of the metal-solvent catalyst from the interstitial regions of the PCD body and form superhard table 128 comprising a PCD table. For example, the as-sintered PCD body may be immersed in or exposed to the acid for about 2 to about 7 days (e.g., about 3, 5, or 7 days) or for a few weeks (e.g., about 4 weeks) depending on the process employed.

Even after leaching, a residual, detectable amount of the metal-solvent catalyst may be present in the at least partially leached superhard table 128. It is noted that when the metal-solvent catalyst is infiltrated into the diamond particles from a cemented tungsten carbide substrate including tungsten carbide particles cemented with a metal-solvent catalyst (e.g., cobalt, nickel, iron, or alloys thereof), the infiltrated metal-solvent catalyst may carry tungsten and/or tungsten carbide therewith and the as-sintered PCD body may include such tungsten and/or tungsten carbide therein disposed interstitially between the bonded diamond grains. The tungsten and/or tungsten carbide may be at least partially removed by the selected leaching process or may be relatively unaffected by the selected leaching process.

In some embodiments, only selected portions of the as-sintered PCD body may be leached, leaving remaining portions of resulting superhard table 128 in an unleached state. For example, some portions of one or more surfaces of the as-sintered PCD body may be masked or otherwise protected from exposure to a leaching solution and/or gas mixture while other portions of one or more surfaces of the as-sintered PCD body may be exposed to the leaching solution and/or gas mixture. Other suitable techniques may be used for removing a metal-solvent catalyst and/or other materials from the as-sintered PCD body or may be used to accelerate a chemical leaching process. For example, exposing the as-sintered PCD body to heat, pressure, electric current, microwave radiation, and/or ultrasound may be employed to leach or to accelerate a chemical leaching process, without limitation. Following leaching, at least a portion of superhard table 128 may comprise a volume of PCD material that is substantially free of a metal-solvent catalyst.

The plurality of diamond particles used to form superhard table 128 comprising the PCD material may exhibit one or more selected sizes (e.g., unimodal, bimodal, or multimodal distributions). The one or more selected sizes may be determined, for example, by passing the diamond particles through one or more sizing sieves or by any other method. In an embodiment, the plurality of diamond particles may include a relatively larger size and at least one relatively smaller size. As used herein, the phrases "relatively larger" and "relatively smaller" refer to particle sizes determined by any suitable method, which differ by at least a factor of two (e.g., 40 μm and 20 μm). More particularly, in various embodiments, the plurality of diamond particles may include a portion exhibiting a relatively larger size (e.g., 100 μm, 90 μm, 80 μm, 70 μm, 60 μm, 50 μm, 40 μm, 30 μm, 20 μm, 15 μm, 12 μm, 10 μm, 8 μm) and another portion exhibiting at least one relatively smaller size (e.g., 30 μm, 20 μm, 15 μm, 12 μm, 10 μm, 8 μm, 4 μm, 2 μm, 1 μm, 0.5 μm, less than 0.5 μm, 0.1 μm, less than 0.1 μm). In another embodiment, the plurality of diamond particles may include a portion exhibiting a relatively larger size between about 40 μm and about 15 μm and another portion exhibiting a relatively smaller size between about 12 μm and 2 μm. Of course, the plurality of diamond particles may also include three or more different sizes (e.g., one relatively larger size and two or more relatively smaller sizes) without limitation. In some embodiments, the diamond particles may be selected based on the expected forces that are to be applied to force element. For example, in instances where a thrust force is expected to be greater than a rational force, the particle size of the thrust elements may be greater than the torque elements.

In operation, the first force coupling assembly 102 may be coupled to a first movable component (e.g., a rotating shaft) and the second force coupling assembly 108 may be coupled to another movable component or tool (e.g., another rotating shaft or rotating component or tool). The force coupling assembly 100 may transfer or couple a force applied to the shaft (e.g., torque provided by a motor) to another movable component via the force coupling assembly 100.

As the force is applied, the contact surfaces 126 of the contact elements 104 will engage with the contact surfaces 136 of the contact elements 110. For example, the contact surfaces 126, 136 may engage with each other after at least some relative rotation between the first support structure 106 and the second support structure 112 (e.g., less than 1 degree to 15 degrees). Such rotation may occur as the force coupling assembly 100 is initially placed under a load or force (e.g., from the motor). As depicted, central portions of the contact surfaces 126, 136 may engage with each other (e.g., where the contact surfaces 126, 136 are loaded substantially in compression) in order to transfer forces between the first support structure 106 and the second support structure 112. In some embodiments, the contact surfaces 126, 136 may be at least partially rotational offset from each other, for example, while still contacting substantially at the center portions or may be entirely offset and interlocked as discussed below.

In additional embodiments, the contact elements 104, 110 may be configured to enable little to substantially no relative rotation between the first support structure 106 and the second support structure 112.

As depicted, the partially spherical shape of the contact surfaces 136 of the contact elements 110 may apply a point loading (e.g., in compression) to the contact surfaces 126 of the contact elements 104.

In some embodiments, the material of the contact surfaces 126, 136 may be selected to provide a coefficient of friction that will enable the contact surfaces 126, 136 to engage and remain substantially stational relative to each other once under loading.

In some embodiments, the shape of the contact surfaces 126, 136 may be selected to provide resistance to relative motion therebetween (e.g., an interference fit), where one or more of the contact surfaces 126, 136 includes a feature that engages the other surface and then limits or stops (e.g., ceases) further relative movement between the contact surfaces 126, 136. For example, as depicted, the cylindrical shape of the contact surfaces 126 of the first support structure 106, which exhibit a planar surface in a direction about the rotational direction of the force coupling assembly 100, may limit and/or substantially prevent the spherical shape of the contact surfaces 136 of the first support structure 106 from rotation relative to the contact surfaces 126 of the first support structure 106.

The shape of the contact surfaces 126, 136 may be selected to enable the first support structure 106 and the second support structure 112 to be assembled and disassembled by moving or positioning (e.g., sliding) one or the structures 106, 112 into the other of the structures 112 106, respectively.

As noted above, the relative shapes of the contact surfaces 126, 136 may be selected such that the first support structure 106 and the second support structure 112 may tilt relative to one another. For example, the depicted contact surfaces 126 having a partially substantially cylindrical shape may provide a substantially elliptical (e.g., circular) path on which the partially substantially spherical contact surfaces 136 may travel in a direction transverse (e.g., perpendicular) to the direction of rotation. In some embodiments, the partially substantially cylindrical contact surfaces 126 may enable at least some axial movement of the contact elements 110 to compensate for one or more of axial misalignment, tilt, and/or axial deflection (e.g., shaft deflection). For example, the contact surfaces 126 may allow for some axial translation and/or lateral movement resulting in rotation of the shaft to which the force coupling assembly 100 is coupled.

While the contact surfaces 126, 136 above are partially substantially cylindrical and partially spherical in shape, the contact surface 126, 136 may be selected as any suitable shape. For example, the contact elements 104, 110 may comprise contact surfaces 126, 136 of any combination of one or more of a substantially planar surface, a partially convex substantially spherical surface, a partially concave substantially spherical surface, a partially convex substantially cylindrical surface, a partially concave substantially cylindrical surface, or a surface defining a portion of an interlocking feature. Example embodiments of some of these configurations are discussed below.

Figure 4:
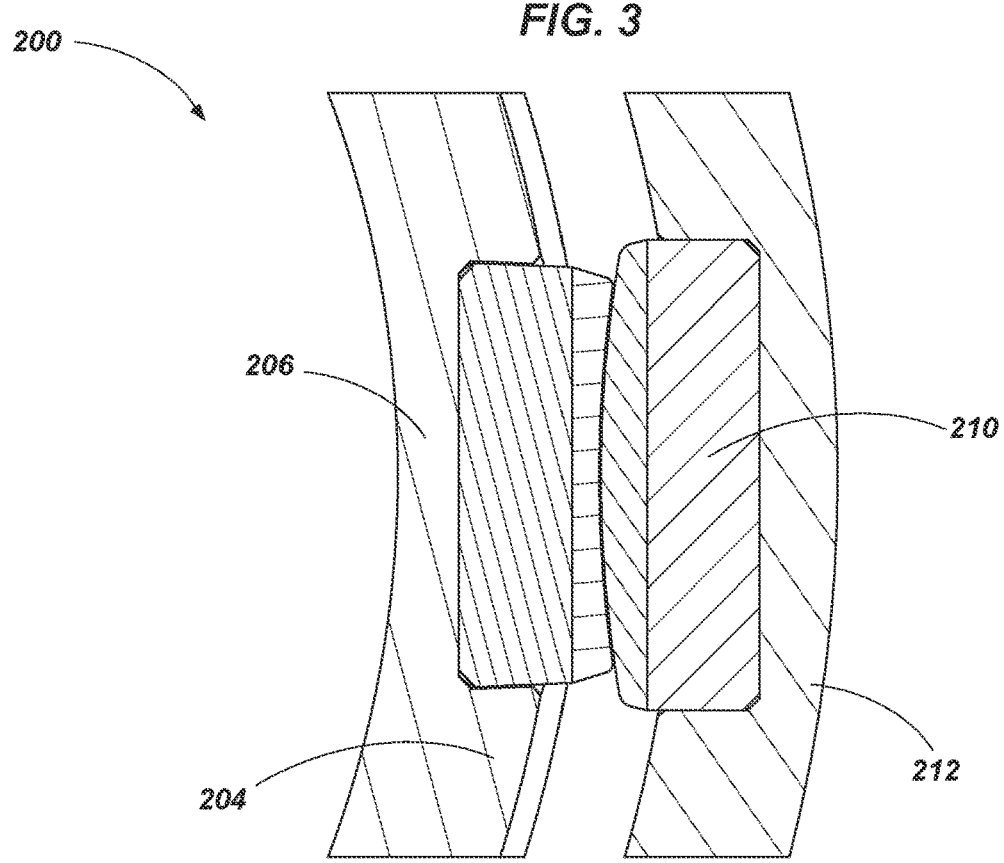
FIG. 4 is a cross-sectional view of a portion of a force coupling assembly according to an embodiment of the disclosure.
Figure 5:
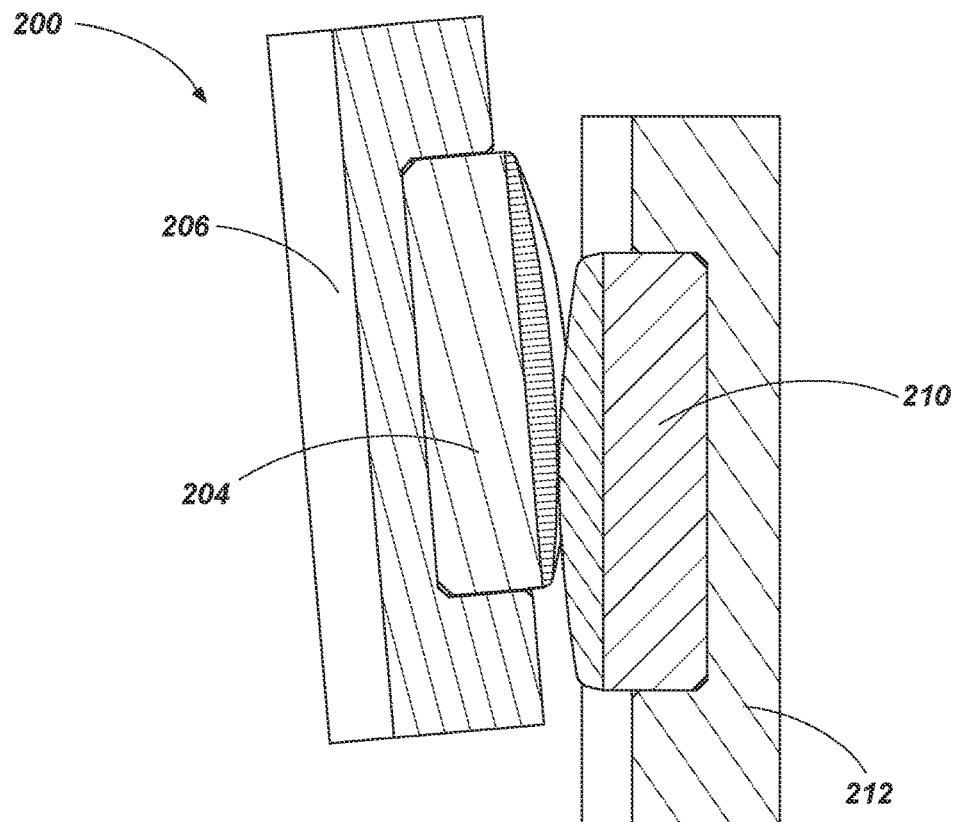
FIG. 5 is a cross-sectional view of a portion of a force coupling assembly according to an embodiment of the disclosure.

FIGS. 4 and 5 are cross-sectional views of a portion of a force coupling assembly 200 including contact elements 204, 210 on opposing support structures 206, 212. The force coupling assembly 200 may be similar to and/or may include any feature or features of the various elements discussed herein, in any combination, without limitation.

As shown in FIGS. 4 and 5, where the cross-sections are taken in substantially perpendicular directions to each other (e.g., with FIG. 4 depicting a cross section along a radial plane and FIG. 5 along an axial plane), the contact elements 204 on the inner support structure 206 may exhibit a slotted shape. For example, the contact elements 204 may exhibit a concave substantially elliptical shape (e.g., a partially substantially cylindrical shape) defining a concave substantially elliptical (e.g., circular) path. The contact elements 210 on the outer support structure 212 may exhibit a convex substantially elliptical shape (e.g., a partially substantially spherical shape).

As best shown in FIG. 4, such a configuration may substantially limit rotation of the support structures 206, 212 relative to each other. For example, the partially substantially spherical shape of the contact elements 210 may be held in a lower portion of the concave partially substantially cylindrical contact elements 204 and be prohibited from rotation by the two raised side ramp portions of the partially substantially cylindrical contact elements 204.

As best shown in FIG. 5, such a configuration may enable the support structures 206, 212 to tilt relative to each other, where FIG. 5 illustrates a tilted position. For example, the partially substantially spherical shape of the contact elements 210 may allow for displacement of the partially substantially spherical shape of the contact elements 210 along or away from a lower portion of the partially substantially cylindrical contact elements 204.

Figure 6:
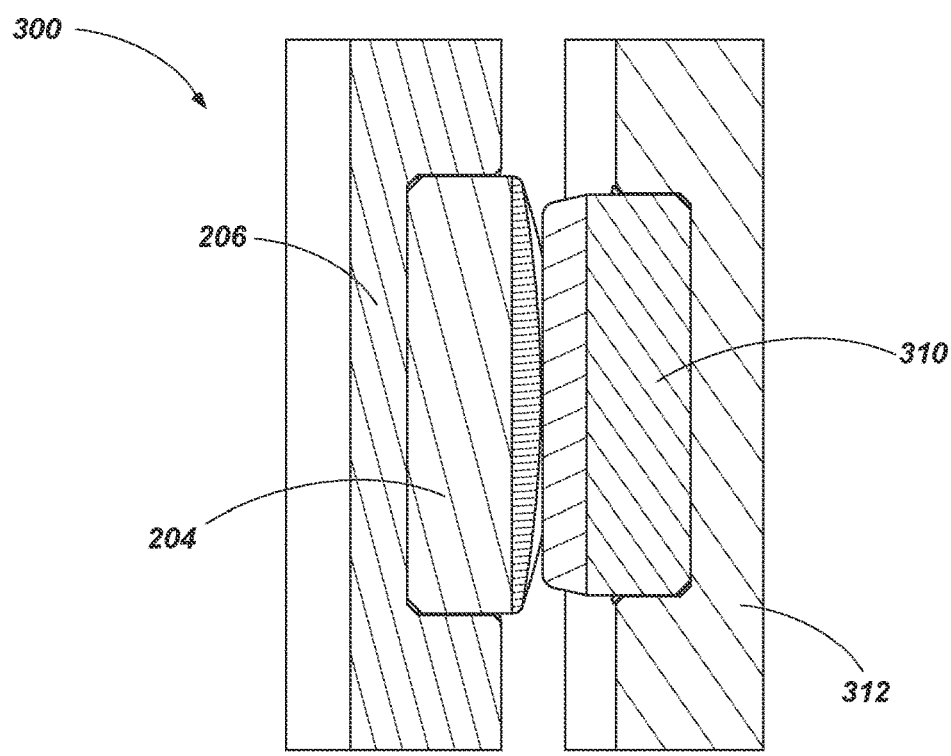
FIG. 6 is a cross-sectional view of a portion of a force coupling assembly according to an embodiment of the disclosure.

FIG. 6 is a cross-sectional view of a portion of a force coupling assembly 300 including contact elements 204, 310 on opposing support structures 206, 312. The force coupling assembly 300 may be substantially similar to the force coupling assembly 200 and/or may include any feature or features of the force coupling assembly 200, in any combination, without limitation. However, the contact elements 310 may also exhibit a partially cylindrical shape with the lower portion extending along the axial direction.

Figure 7:
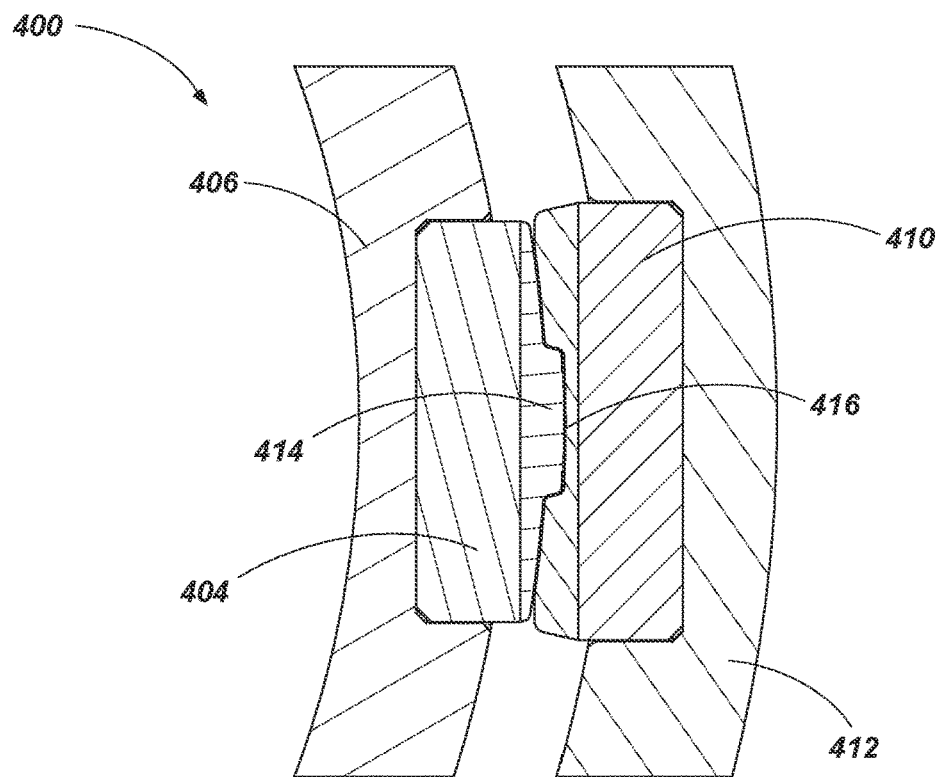
FIG. 7 is a cross-sectional view of a portion of a force coupling assembly according to an embodiment of the disclosure.
Figure 8:
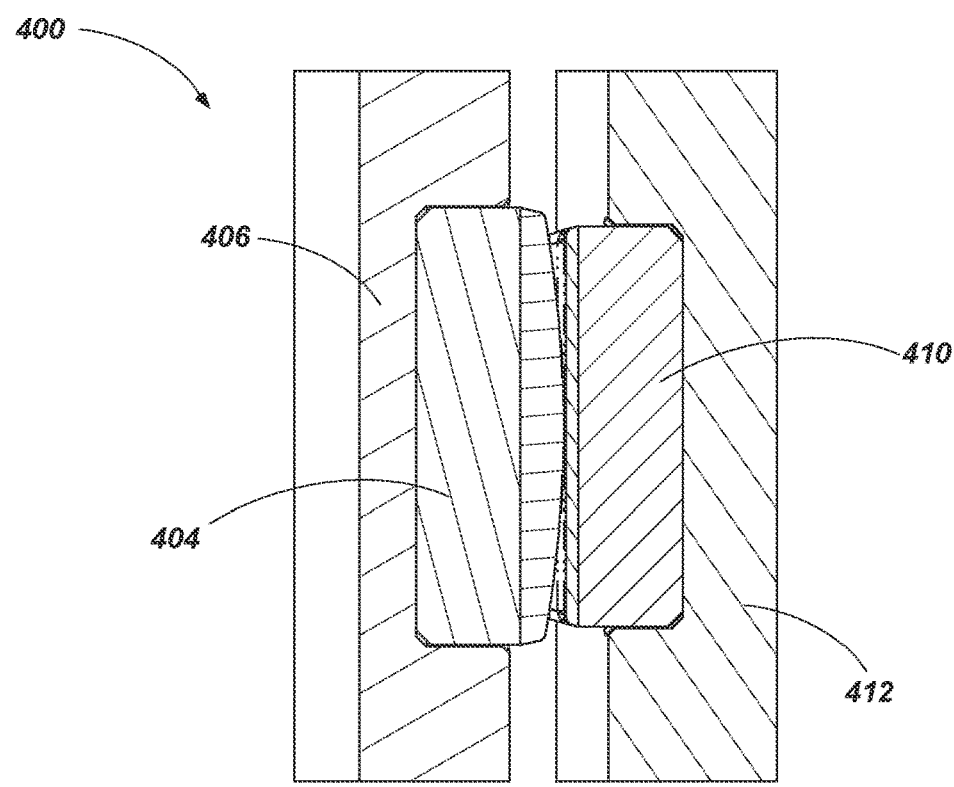
FIG. 8 is a cross-sectional view of a portion of a force coupling assembly according to an embodiment of the disclosure.

FIGS. 7 and 8 are cross-sectional views of a portion of a force coupling assembly 400 including contact elements 404, 410 on opposing support structures 406, 412. The force coupling assembly 400 may be similar to and/or may include any feature or features of the various elements discussed herein, in any combination, without limitation.

As shown in FIGS. 7 and 8, where the cross-sections are taken in substantially perpendicular directions to each other (e.g., with FIG. 7 depicting a cross section along a radial plane and FIG. 8 along an axial plane), the contact elements 404, 410 may collection define an interlocking feature in at least one direction. For example, the contact elements 404 on the inner support structure 406 may exhibit a protrusion or post 414 and the contact elements 410 on the outer support structure 412 may exhibit a complementary recess or slot 416. In additional embodiments, the posts and recesses may be placed in reverse of that shown in FIG. 7.

As best shown in FIG. 7, such a configuration may substantially prohibit rotation of the support structures 406, 412 relative to each other. For example, the collective interlocking features of the contact elements 404, 410 may engage and substantially limit or substantially prohibit the contact elements 404, 410 from rotation. As depicted, the interlocking features of the contact elements 404, 410 may only substantially limit or substantially prohibit movement in one manner or direction (e.g., substantially prohibiting rotation while enabling axial movement or tilt).

As best shown in FIG. 8, in some embodiments, such a configuration may enable the support structures 406, 412 to tilt relative to each other. For example, the partially substantially spherical shape of the contact elements 410 may exhibit a partially substantially spherical shape (e.g., a convex partially substantially cylindrical shape) and enable the contact elements 410 to move along the post 414 of the contact elements 404 regardless of the interlocking feature.

Figure 9:
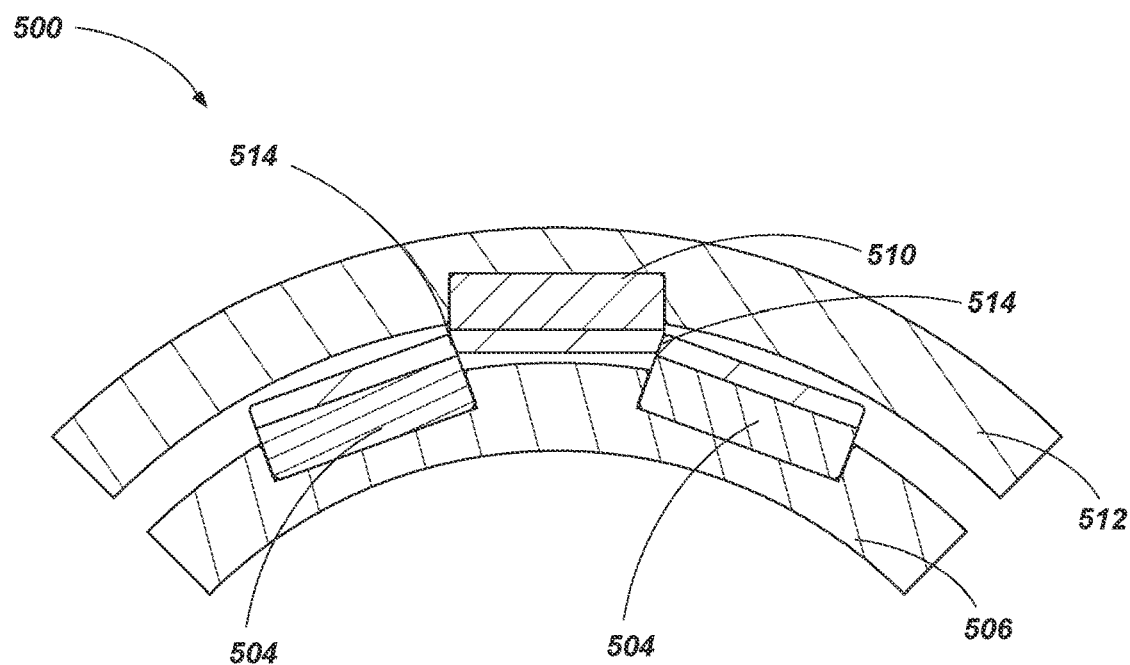
FIG. 9 is a cross-sectional view of a portion of a force coupling assembly according to an embodiment of the disclosure.

FIG. 9 is a cross-sectional view of a portion of a force coupling assembly 500 including contact elements 504, 510 on opposing support structures 506, 512. The force coupling assembly 500 may be substantially similar to and may include one or more features of the force coupling assembly 400, in any combination, without limitation. For example, force coupling assembly 500 may include one or more interlocking features. However, contact elements 504 on the support structure 506 may be offset from and interleave with contact elements 510 on the support structure 512 in order to provide an interference fit 514 (e.g., where at least some of the forces may be in tensile loading as one edge of the contact elements 504 is forced into an adjacent edge of the contact elements 510).

Figure 10:
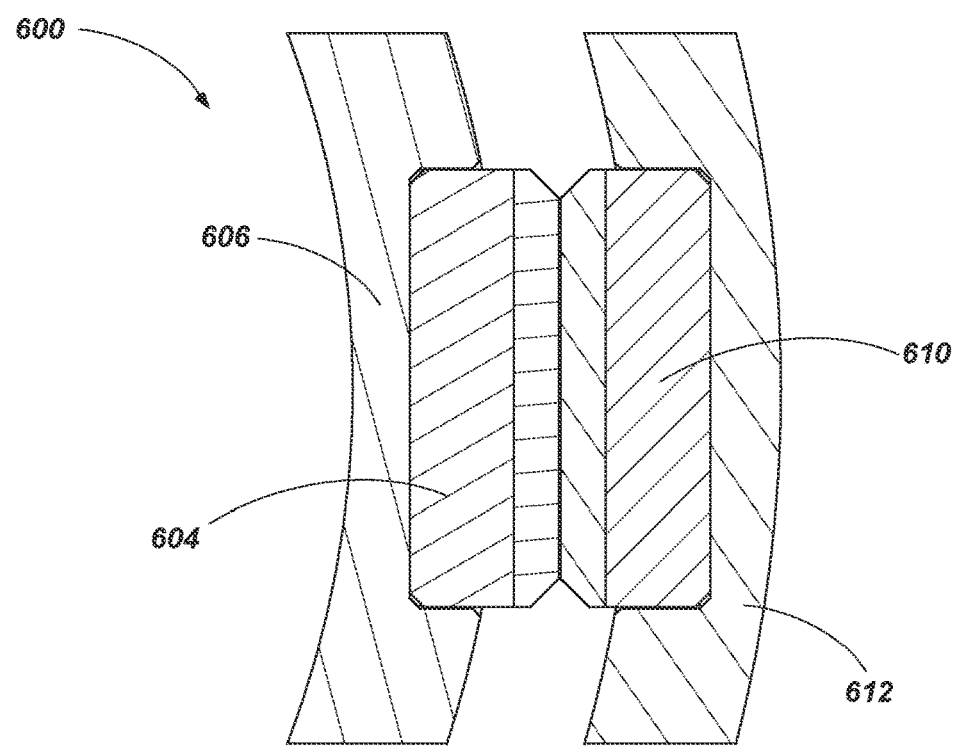
FIG. 10 is a cross-sectional view of a portion of a force coupling assembly according to an embodiment of the disclosure.
Figure 11:
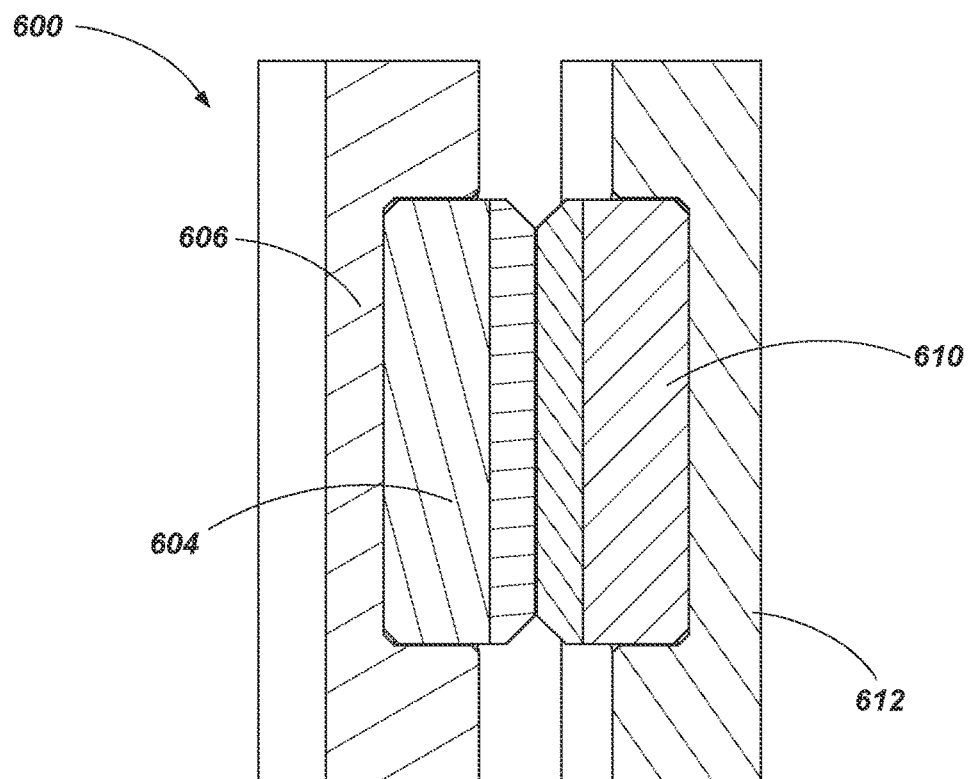
FIG. 11 is a cross-sectional view of a portion of a force coupling assembly according to an embodiment of the disclosure.

FIGS. 10 and 11 are cross-sectional views of a portion of a force coupling assembly 600 including contact elements 604, 610 on opposing support structures 606, 612. The force coupling assembly 600 may be similar to and may include one or more features of any of the various elements discussed herein, in any combination, without limitation.

As shown in FIGS. 10 and 11, where the cross-sections are taken in substantially perpendicular directions to each other (e.g., with FIG. 10 depicting a cross-sectional view along a radial plane and FIG. 11 along an axial plane), in one embodiment, the contact elements 604 on the inner support structure 606 may exhibit a substantially planar contact surface. In such an embodiment, the contact elements 610 on the outer support structure 612 may also exhibit a substantially planar contact surface.

Such a configuration may substantially limit or prohibit rotation and tilt of the support structures 606, 612 relative to each other.

Figure 12:
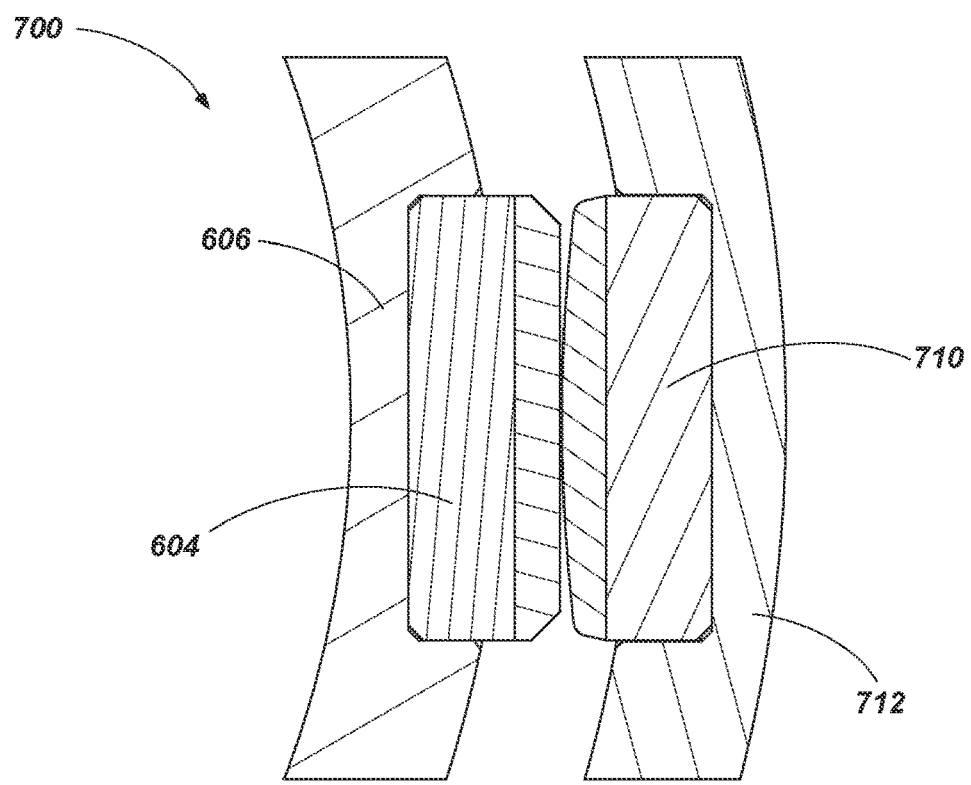
FIG. 12 is a cross-sectional view of a portion of a force coupling assembly according to an embodiment of the disclosure.

FIG. 12 is a cross-sectional view of a portion of a force coupling assembly 700 including contact elements 604, 710 on opposing support structures 606, 712. The force coupling assembly 700 may be substantially similar to and may include one or more feature of the force coupling assembly 600, in any combination, without limitation. However, the contact elements 710 may also exhibit a substantially elliptical shape, for example, a partially substantially cylindrical shape with the upper central ridge or portion extending along the axial direction. Such a configuration may enable at least some rotation of the support structures 606, 612 relative to each other along the curved portion of the convex partially substantially cylindrical surface of the contact elements 710. In additional embodiments, a partially substantially spherical shape may also be implemented on the contact elements 710.

In additional embodiments, the shape of the contact elements 604, 710 may be reversed and/or reorientated in order to enable tilt of the support structures 606, 712 in a similar manner to that discussed above (e.g., when the upper central ridge or portion is rotated 90 degrees).

Figure 13:
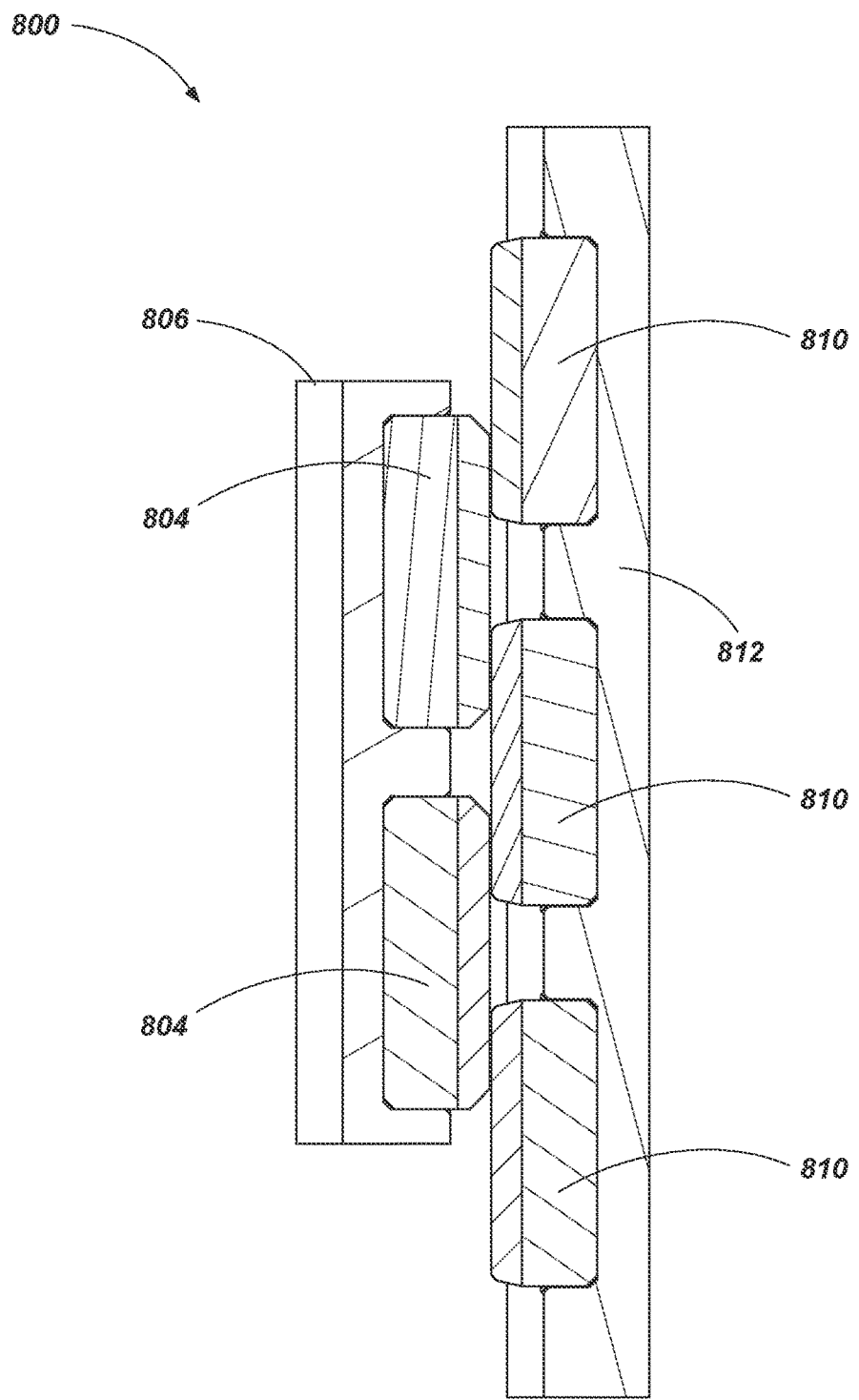
FIG. 13 is a cross-sectional view of a portion of a force coupling assembly according to an embodiment of the disclosure.

FIG. 13 is a cross-sectional view of a portion of a force coupling assembly 800 including contact elements 804, 810 on opposing support structures 806, 812. The force coupling assembly 800 may be substantially similar to any of the force coupling assemblies discussed above and may include one or more features of any of the elements and/or materials described herein, in any combination, without limitation. As shown in FIG. 13, each of the support structures 806, 812 may include one or more rows of contact elements 804, 810 (e.g., two rows, three rows, four rows or more, combinations thereof).

As depicted in FIG. 13, such a configuration may enable axial movement between the support structures 806, 812 while at least some of the rows of contact elements 804, 810 remain in contact in order to couple the forces applied between the support structures 806, 812.

Figure 14:
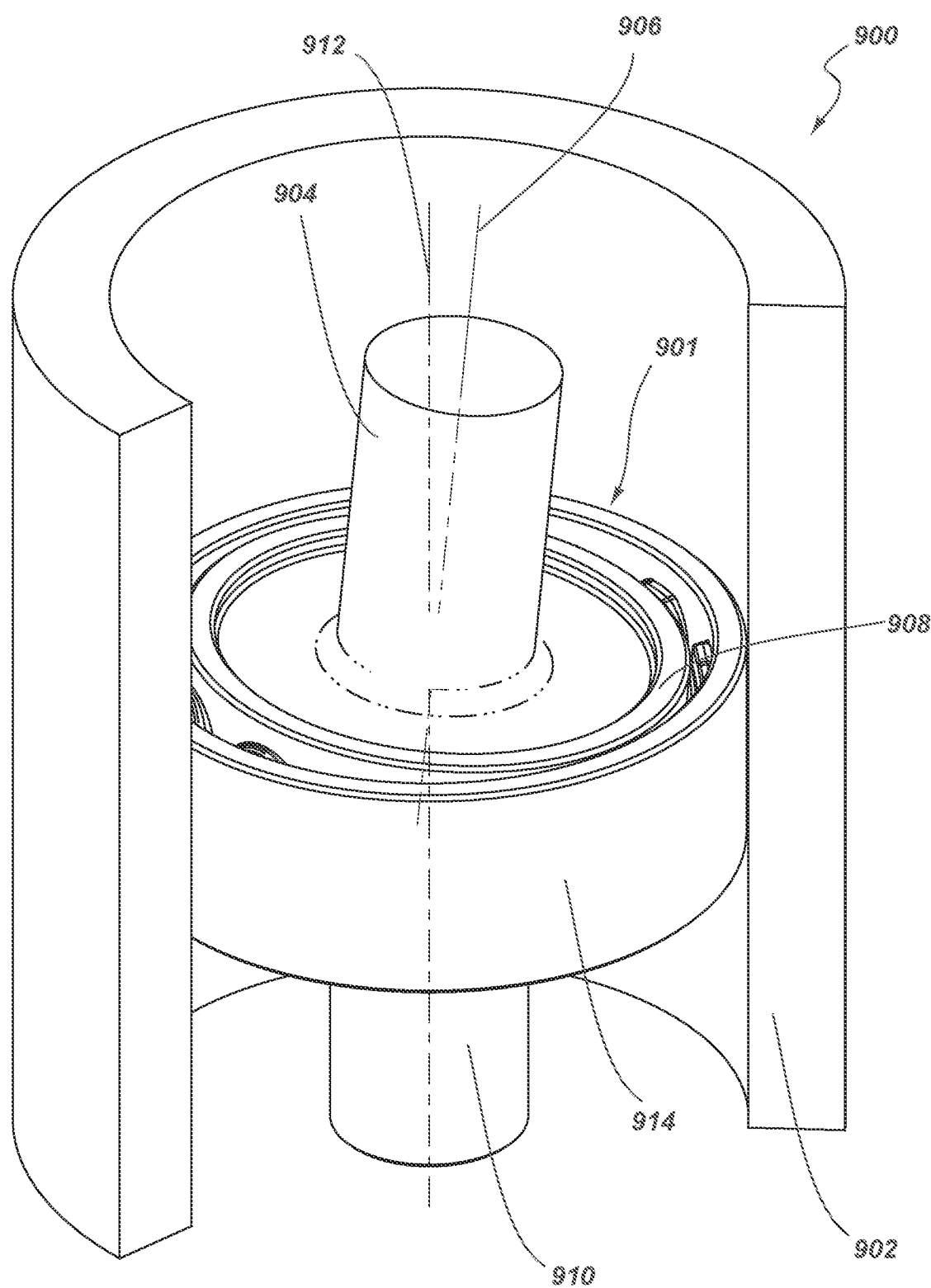
FIG. 14 is a partial cut-away perspective view of a subterranean drilling system including one or more force coupling assembly according to an embodiment of the disclosure.

FIG. 14 is a partial cross-sectional perspective view of an exemplary assembly or system (e.g., subterranean or downhole system 900) that includes a force coupling assembly 901 (e.g., any of force coupling assemblies 100, 200, 300, 400, 500, 600, 700, 800). As shown in FIG. 14, subterranean system 900 may include a housing 902 with a shaft (e.g., output shaft 904) that is directly or indirectly operably coupled to a rotational energy device, such as for example, a downhole drilling motor (e.g., a motor, turbine, or any other suitable device capable of rotating an output shaft, without limitation). In other embodiments, generally, force coupling assemblies, as disclosed herein, may be employed in rotating systems in a variety of applications (e.g., pumps, motors, turbines, generators, etc.) where transmission of forces (e.g., torque) is required.

For example, force coupling assembly 901 may be operably coupled to the output shaft 904 having an axis of rotation 906 (e.g., centerline, longitudinal axis) at a support structure of the force coupling assembly 901 (e.g., inner support structure 908) such that the force coupling assembly 901 rotates in conjunction with the output shaft 904. The force coupling assembly 901 may also be coupled to another movable component of the subterranean system 900 (e.g., another rotating shaft 910) at another support structure of the force coupling assembly 901 (e.g., outer support structure 914). The another rotating shaft 910 may have an axis of rotation 912 (e.g., centerline, longitudinal axis).

The respective shafts 904, 910 may be integral with or attached to (e.g., modular) the support structures 908, 914 of the force coupling assembly 901. For example, the respective shafts 904, 910 may be attached the force coupling assembly 901 (e.g., a respective one of the inner support structure 908 or the outer support structure 914) through brazing, press-fitting, threaded attachment, pin attachment, bonding, frictional engagement, splines, welding, keying, clamping, and/or by any other suitable attachment mechanism or structure. As depicted in FIG. 9, the force coupling assembly 901 integrated with one or more of the respective shafts 904, 910 (e.g., via the attachment methods discussed above). In additional embodiments, the force coupling assembly 901 may be modular with the respective shafts 904, 910 (e.g., removable as discussed below with references to FIGS. 14 and 15).

In some embodiments, the outer support structure 914 and the shaft 910 may define a cup-shaped socket in which the inner support structure 908 with the shaft 904 attached thereto is received.

As discussed above, the contact elements of the force coupling assembly 901 may engage to couple a force (e.g., torque) applied to the output shaft 904 (e.g., by the motor) to the another rotating shaft 910.

As also discussed above, the force coupling assembly 901 may couple the torque between the output shaft 904 and the another rotation shaft 910 while the respective axes of the rotation 906, 912 are angularly offset or coincident. For example, as depicted, the output shaft 904 and the another rotation shaft 910 may be offset relative to each other with the respective axes of the rotation 906, 912 being angularly offset except for a point where the axes of the rotation 906, 912 intersect.

In some embodiments, rotating shaft 910 may in turn drive a downhole tool (e.g., a rotary drill bit, a reamer, etc.) configured to engage a subterranean formation.

Any of the force coupling assemblies disclosed herein may be used in subterranean system 900, without limitation.

According to various embodiments, drilling fluid may be circulated through the downhole drilling motor to generate torque and effect rotation of output shaft 904 and the rotating shaft 910 coupled to the output shaft via the force coupling assembly 901 so that a torque applied to the output shaft 904 may be transferred to the rotating shaft 910. In some embodiments, some of the drilling fluid may be in contact with the opposing contact surfaces of the force coupling assembly 901 for lubrication and/or cooling of the force coupling assembly 901.

Figure 15:
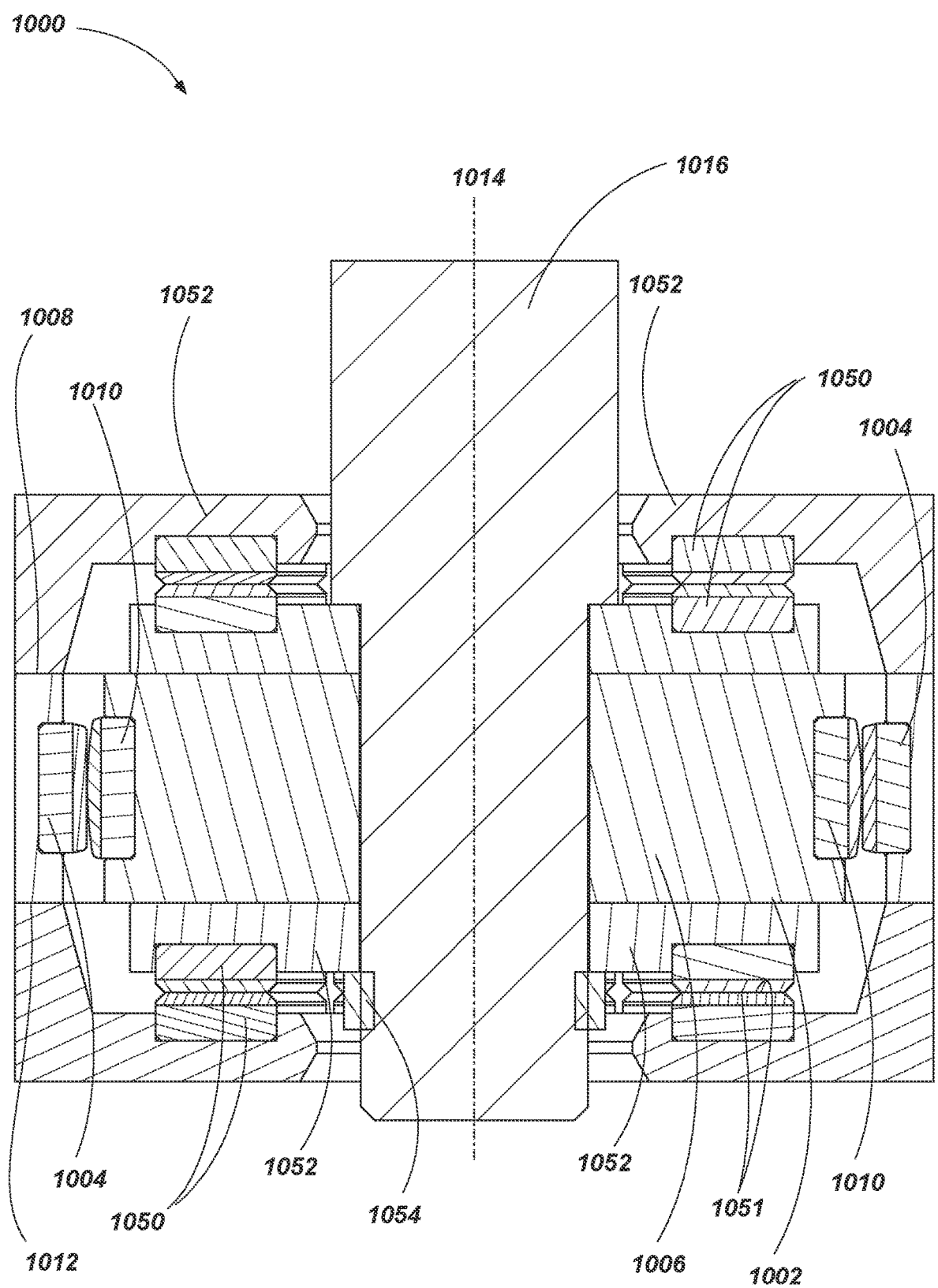
FIG. 15 is a cross-sectional view of a force coupling assembly including thrust bearing elements according to an embodiment of the disclosure.

FIG. 15 is a cross-sectional view of a force coupling assembly 1000 including one or more thrust bearing elements 1050 (e.g., providing bearing surfaces for axial and/or thrust loadings). In some embodiments, the force coupling assembly 1000 may include the thrust bearing elements 1050 (e.g., three or more discrete thrust bearing elements 1050) along with torque transfer elements that may be similar those discusses above (e.g., for transferring forces to and/or from shaft 1016). For example, force coupling assembly 1000 may include first force coupling assembly 1002 and second force coupling assembly 1008, each including torque contact elements 1004, 1010 coupled to support structures 1006, 1012 for primarily transferring forces or loads (e.g., torque, in either applied direction) between the first force coupling assembly 1002 and the second force coupling assembly 1008.

As depicted, contact surfaces 1051 of the thrust bearing elements 1050 may be primarily positioned in (e.g., extend along) a direction transverse (e.g., offset, oblique, perpendicular) to a longitudinal axis 1014 of the force coupling assembly 1000. In such a configuration the thrust bearing elements 1050 may act to support a primarily axial load through superhard materials of the thrust bearing elements 1050 (e.g., diamond and/or other materials as discussed above). For example, the thrust bearing elements 1050 may be positioned to support loads or forces that are at least partially directed (e.g., primarily directed, a majority of being directed) in an axial direction along the longitudinal axis 1014. In some embodiments, the axial loads or forces may be directed at least partially along an axis of rotation of a portion of the force coupling assembly 1000 (e.g., along the shaft 1016). Such an axial load capability may be achieved through the thrust bearing elements 1050 that are separate from the torque contact elements 1004, 1010, where the torque contact elements 1004, 1010 are configured to primarily transfer torque.

As noted above, the force coupling assembly 1000 may be modular with the respective shaft 1016 (e.g., removable). For example, a retaining element 1054 (e.g., a retaining nut) may secure the first force coupling assembly 1002 to the shaft 1016.

As shown in FIG. 15, a majority of the contact surfaces 1051 of the thrust bearing elements 1050 may be oriented substantially perpendicular to the longitudinal axis 1014 of force coupling assembly 1000 in a standard axial load configuration (e.g., where the support structures 1006, 1012 generally do not tilt relative to each other). In additional embodiments, the contact surfaces 1051 of the thrust bearing elements 1050 may be oriented at an angle relative to the longitudinal axis 1014 of force coupling assembly 1000 (e.g., as shown below in FIG. 16, where the support structures may tilt relative to each other similar to that shown above in FIG. 5).

Figure 16:
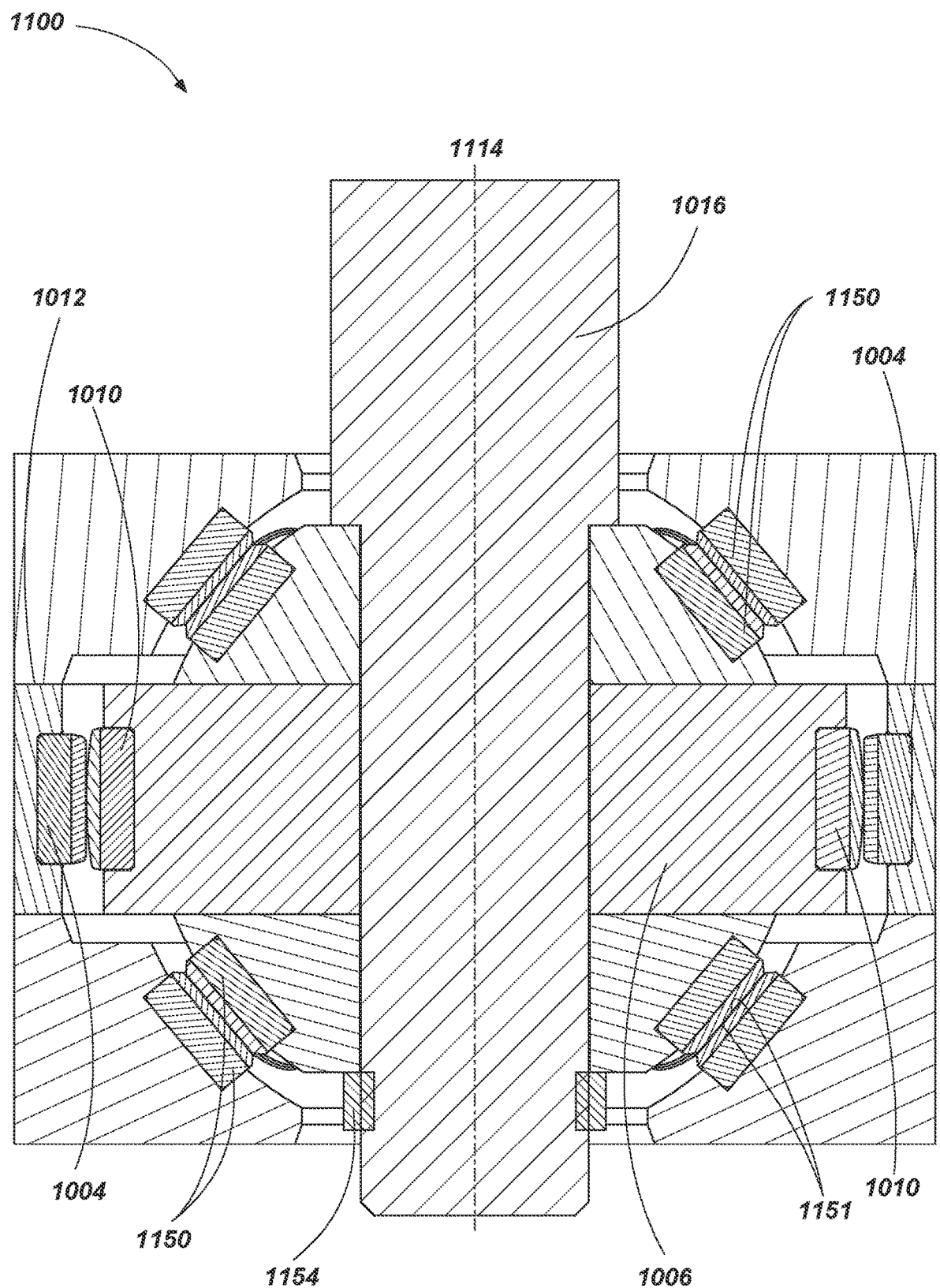
FIG. 16 is a cross-sectional view of another force coupling assembly including thrust bearing elements according to an embodiment of the disclosure.

In some embodiments, the thrust bearing elements 1050 may be positioned on both axial sides of the first force coupling assembly 1002 (e.g., as shown in FIGS. 15 and 16) to provide axial load bearing in both axial directions. For example, the thrust bearing elements 1050 may be positioned on both axial sides of the torque contact elements 1004, 1010.

In additional embodiments, the thrust bearing elements 1050 may be positioned on one axial side of the first force coupling assembly 1002 to provide axial load bearing in one axial direction.

In some embodiments, the thrust bearing elements 1050 may be included on the same structure that support the torque transfer elements (e.g., on the support structures 1006, 1012 along with the torque contact elements 1004, 1010). In additional embodiments, and as depicted in FIGS. 15 and 16, the thrust bearing elements 1050 may be positioned on support elements 1052 that are separate from (e.g., but connected to) the support structures 1006, 1012. In some embodiments, the support elements 1052 may be able to move (e.g., rotate) relative to one or both of the support structures 1006, 1012.

FIG. 16 is a cross-sectional view of another force coupling assembly 1100 including thrust bearing elements 1150, which may be similar to the force coupling assemblies above and, in particular, to the force coupling assembly 1000 discussed above in relation to FIG. 15. The force coupling assembly 1100 may include both torque contact elements 1004, 1010 and thrust bearing elements 1150 position on support structures 1006, 1012 (e.g., which may be integrated or separate torque and thrust structure as discussed above). As noted above, the thrust bearing elements 1150 may be oriented at an angle relative to the longitudinal axis 1114 of force coupling assembly 1100. For example, the thrust bearing elements 1150 may be oriented at an oblique angle relative to the longitudinal axis 1114 of force coupling assembly 1100, such as 1 to 90 degrees, about 30 degrees, about 45 degrees, about 60 degrees, variations therebetween, etc.). The thrust bearing elements 1150 may be oriented at an oblique angle relative to contact surfaces 1151 of the torque contact elements 1004, 1010. Such configurations may enable the support structures 1006, 1012 to tilt relative to each other (e.g., similar to that shown above in FIG. 5).

As noted above, the force coupling assembly 1100 may be modular with the respective shaft 1116 (e.g., removable). For example, a retaining element 1154 (e.g., a retaining nut) may secure the support structure 1006 to the shaft 1016.

As above, contact surfaces 1151 of the torque contact elements 1004, 1010 may include any shapes discussed herein. Similarly, the thrust bearing elements 1050, 1150 may include contact surfaces 1151 having matching or dissimilar surfaces comprising any of the surfaces discussed herein. For example, contact surfaces 1151 of the thrust bearing elements 1050, 1150 may include one or more of flat on flat, taper on flat, sphere on flat, taper on taper (e.g., frustoconical), sphere on taper, sphere on sphere, combinations thereof, etc. By way of further example, FIGS. 17 through 22 are cross-sectional views of a portion of a force coupling assembly including thrust bearing elements (e.g., force coupling assembly 1100 including angled thrust bearing elements 1150 having a variety of contact surfaces 1151).

Figure 17:
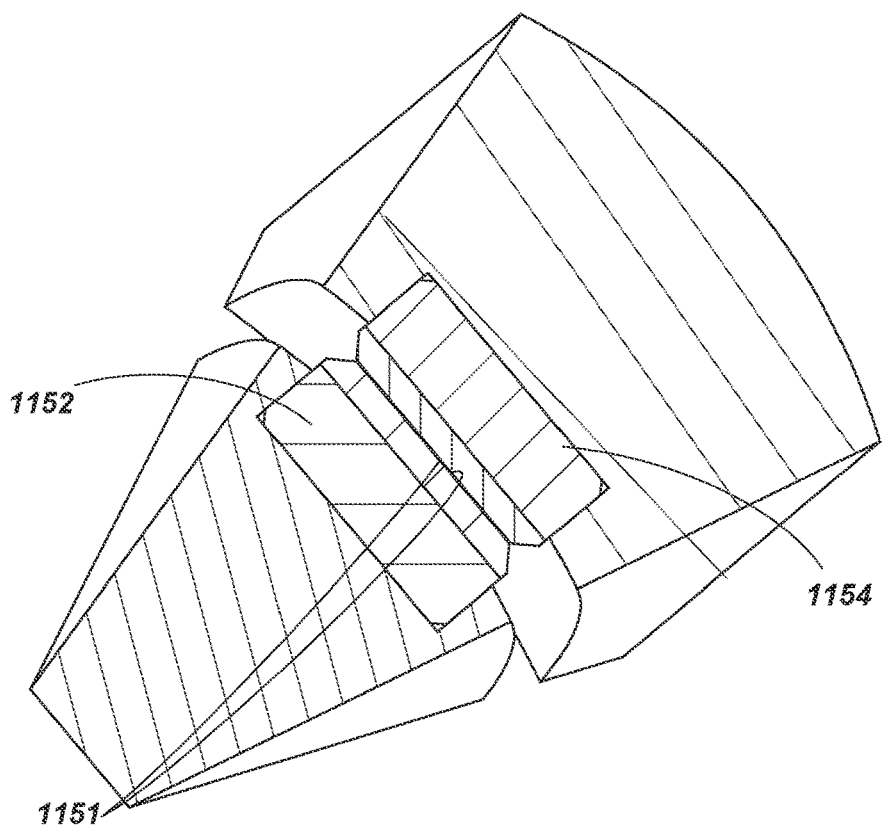
FIG. 17 is a cross-sectional view of a portion of a force coupling assembly including thrust bearing elements according to an embodiment of the disclosure.

As shown in FIG. 17, an inner thrust bearing element 1152 and an outer thrust bearing element 1154 may both include a substantially flat contact surfaces 1151. Such a configuration may provide a straight-line contact surface 1151 in each radial direction having zero rotational degrees of freedom due to the interference of the flat surface.

As discussed herein, the number of rotational degrees of freedom may enable the tilt of the support structures 1006, 1012 relative to each other in one or more rotational directions (e.g., as shown in FIGS. 5 and 14).

Figure 18:
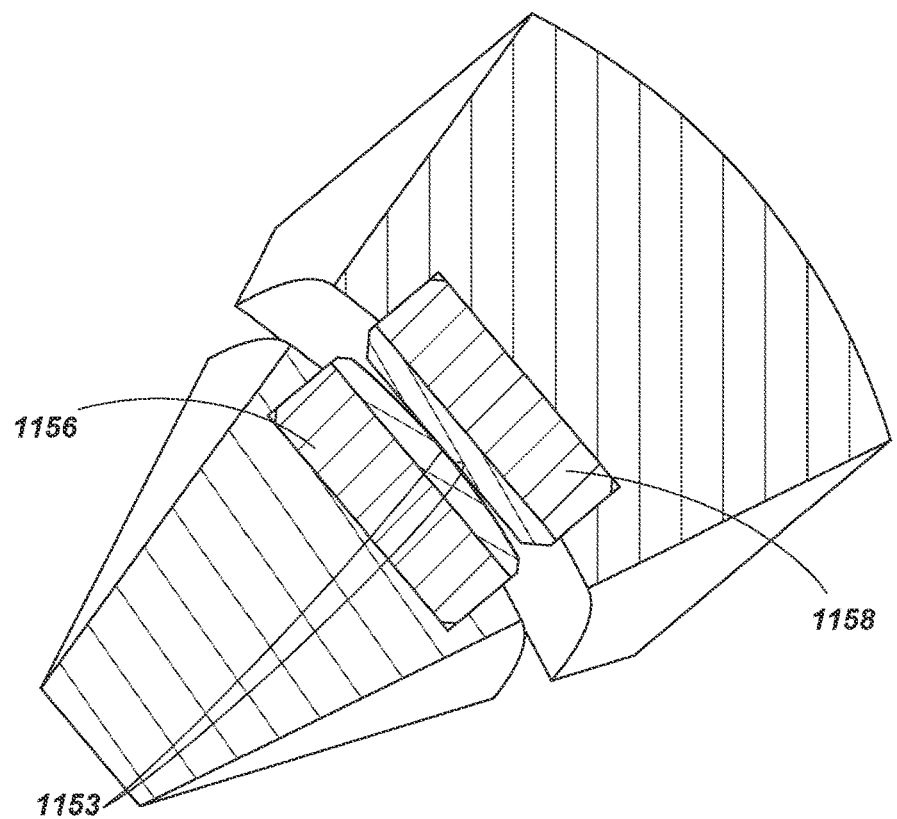
FIG. 18 is a cross-sectional view of a portion of a force coupling assembly according to an embodiment of the disclosure.

As shown in FIG. 18, an inner thrust bearing element 1156 may include a ramped or tapered contact surface 1153 and an outer thrust bearing element 1158 may include a substantially flat contact surface 1153. The tapered contact surface 1153 of the inner thrust bearing element 1156 may be similar the tapered shapes discussed above exhibiting a central higher portion that extends along a diameter of the contact surface 1153 where the central higher portion is bordered on opposing lateral sides by two opposing lower portions. Such a configuration may provide a straight-line contact surface 1153 in one radial direction and a curved partial contact surface 1153 in another perpendicular radial direction with one degree of freedom of movement (e.g., one degree of rotational tilt movement).

Figure 19:
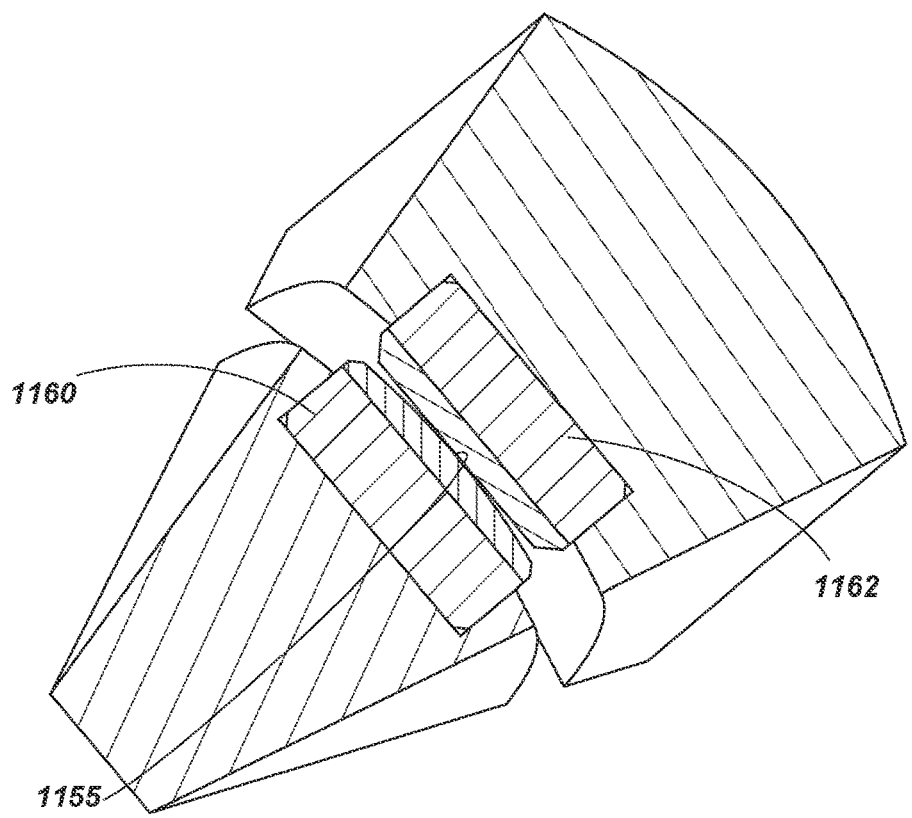
FIG. 19 is a cross-sectional view of a portion of a force coupling assembly according to an embodiment of the disclosure.

As shown in FIG. 19, an inner thrust bearing element 1160 may include a rounded contact surface 1155 (e.g., a partially spheroid or elliptical surface) and an outer thrust bearing element 1162 may include a substantially flat contact surface 1155. Such a configuration may provide a curved line partial contact surfaces 1155 in each radial direction with two degree of freedom of movement (e.g., two degrees of rotational tilt movement).

Figure 20:
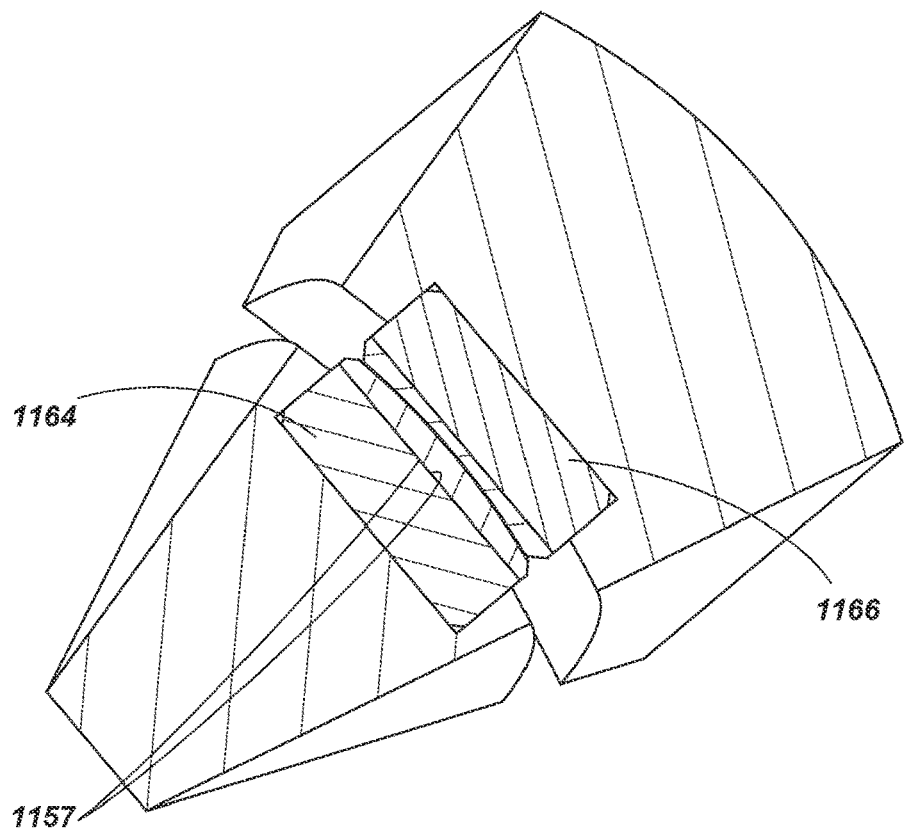
FIG. 20 is a cross-sectional view of a portion of a force coupling assembly according to an embodiment of the disclosure.

As shown in FIG. 20, an inner thrust bearing element 1164 and an outer thrust bearing element 1166 may both include a tapered contact surface 1157, with complementary concave and convex contact surfaces 1157 (e.g., interlocking surfaces in at least one direction). Such a configuration may provide a straight-line contact in one radial direction (e.g., partial frustoconical contact) and curved line contact in another perpendicular direction with one degree of freedom of movement (e.g., one degree of rotational tilt movement).

Figure 21:
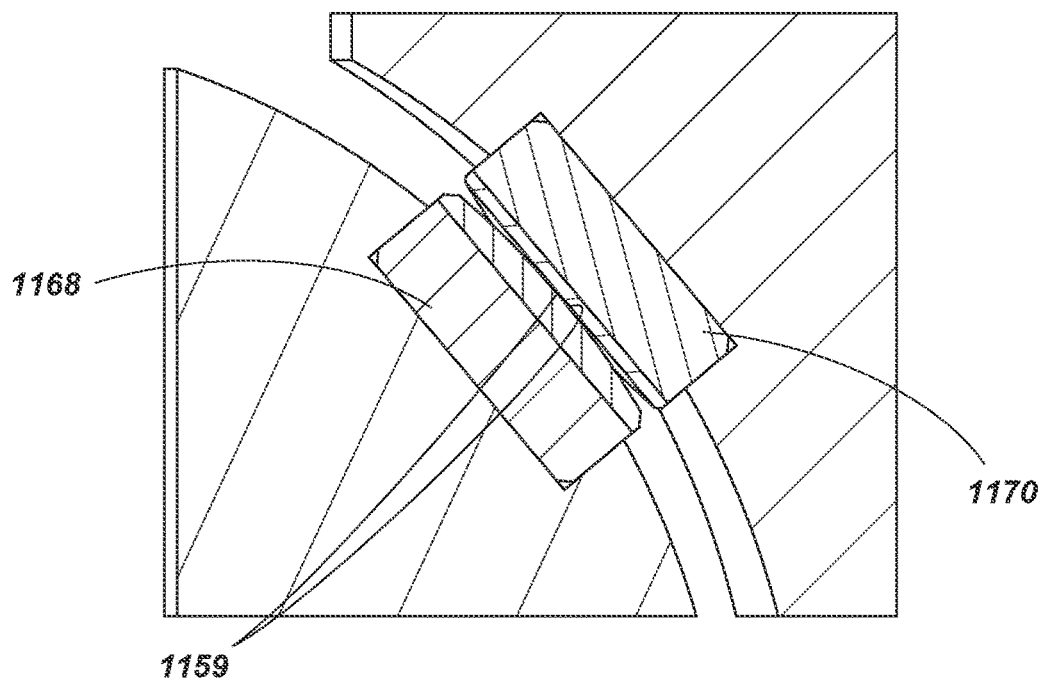
FIG. 21 is a cross-sectional view of a portion of a force coupling assembly according to an embodiment of the disclosure.

As shown in FIG. 21, an inner thrust bearing element 1168 may include a rounded contact surface 1159 (e.g., a partially spheroid or elliptical surface) and an outer thrust bearing element 1170 may include a tapered contact surface 1159 (e.g., a concave tapered surface). Such a configuration may provide a curved line contact in one radial direction and only curved line partial contact in another perpendicular direction with two degrees of freedom of movement (e.g., two degrees of rotational tilt movement).

Figure 22:
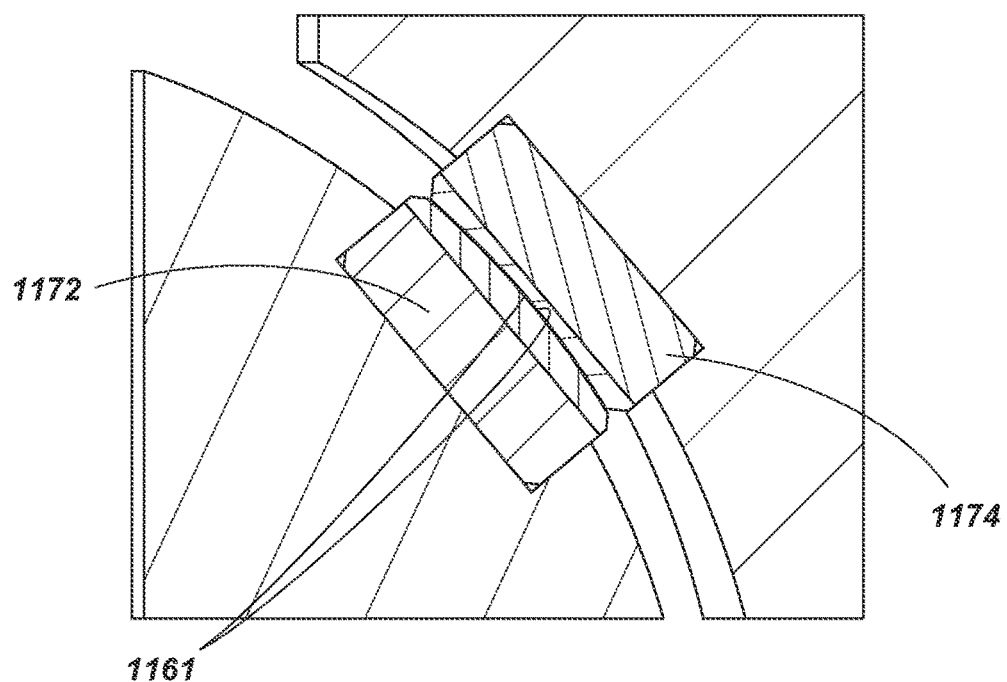
FIG. 22 is a cross-sectional view of a portion of a force coupling assembly according to an embodiment of the disclosure.

As shown in FIG. 22, an inner thrust bearing element 1172 and an outer thrust bearing element 1174 may both include rounded surfaces 1161 (e.g., a partially spheroid or elliptical surfaces), with complementary concave and convex contact surfaces 1161. Such a configuration may provide a curved line contact surfaces in all radial directions with two degrees of freedom of movement (e.g., two degrees of rotational tilt movement).

Embodiments of the present disclosure may provide force coupling assemblies including mating surfaces comprising superhard material that enable the effective transfer of forces (e.g., torque) between components of a system at the engaged superhard surfaces. Such superhard materials may be implemented in caustic, acidic, basic, or other corrosive conditions without having to be sealed or otherwise isolated from environmental elements, such as, for example, from the drilling fluid used during a downhole operation. As noted above, embodiments of the disclose may be implemented in other systems, such as, other subterranean drilling systems, directional drilling systems, turbine generators, windmills, cranes, machinery, pumps, mixers, automotive and marine components, and any other suitable applications, and in any system including abrasive, caustic, acidic, basic, and/or corrosive working fluids or process fluids, without limitation. In some embodiments, force coupling assemblies may enable at least some axial movement to compensate for one or more of axial misalignment, tilt, and/or axial deflection (e.g., shaft deflection) while still enabling the transfer of forces with the force coupling assembly.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. Further, the words "including," "having," and variants thereof (e.g., "includes" and "has") as used herein, including the claims, shall be open ended and have the same meaning as the word "comprising" and variants thereof (e.g., "comprise" and "comprises"). In addition, features from one embodiment may be combined with features of another embodiment while still being encompassed within the scope of the disclosure as contemplated by the inventors.

What is claimed is:

1. A force coupling assembly, comprising:
   an inner assembly including an inner support ring positioned about an inner ring axis;
   an outer assembly including an outer support ring positioned about an outer ring axis;
   superhard contact elements coupled to the inner support ring and the outer support ring, superhard contact surfaces of the superhard contact elements configured to transfer a torque via at least some of the superhard contact elements between the inner assembly and the outer assembly when a rotational force is applied to the force coupling assembly; and
   one or more thrust bearing elements configured to transfer a thrust force applied between the inner assembly and the outer assembly in a direction at least partially along at least one of the inner ring axis or the outer ring axis.

2. The force coupling assembly of claim 1, wherein a thrust contact surface of the one or more thrust bearing elements is positioned transverse to at least one of the inner ring axis or the outer ring axis.

3. The force coupling assembly of claim 2, wherein a thrust contact surface of the one or more thrust bearing elements is positioned substantially perpendicular to at least one of the inner ring axis or the outer ring axis.

4. The force coupling assembly of claim 1, wherein, when at least one of the rotational force or the thrust force is applied between the inner assembly and the outer assembly, the inner assembly is at least partially engaged with the outer assembly and is configured to not substantially rotate relative to the outer assembly.

5. A torque coupling assembly, comprising:
an inner assembly including an inner support ring positioned about an inner ring axis;
an outer assembly including an outer support ring positioned about an outer ring axis;
superhard contact elements coupled to the inner support ring and the outer support ring, superhard contact surfaces of the superhard contact elements configured to transfer a torque via at least some of the superhard contact elements between the inner assembly and the outer assembly when a rotational force is applied to the torque coupling assembly; and
one or more thrust bearing elements comprising additional superhard contact elements, the additional superhard contact elements positioned and configured to support the torque coupling assembly when an axial loading is applied between the inner assembly and the outer assembly in a direction at least partially along at least one of the inner ring axis or the outer ring axis.

6. The torque coupling assembly of claim 5, wherein the superhard contact surfaces of the superhard contact elements are configured to remain in contact with an adjacent superhard contact surface of the superhard contact elements when at least one of the rotational force or the axial loading is applied to the torque coupling assembly.

7. The torque coupling assembly of claim 5, wherein the inner assembly further comprises an inner thrust bearing support structure supporting a first set of the additional superhard contact elements and the outer assembly further comprises an outer thrust bearing support structure supporting a second set of the additional superhard contact elements.

8. The torque coupling assembly of claim 7, wherein the inner thrust bearing support structure and the outer thrust bearing support structure are separate and distinct from the inner support ring and the outer support ring.

9. The torque coupling assembly of claim 7, wherein the inner thrust bearing support structure and the outer thrust bearing support structure are integrated with the inner support ring and the outer support ring.

10. The torque coupling assembly of claim 5, wherein the inner support ring is configured to tilt relative to the outer support ring while at least some of the superhard contact elements and at least some of the additional superhard contact elements remain in contact with each other.

11. The torque coupling assembly of claim 5, wherein the additional superhard contact elements are positioned such that a majority of the superhard contact surfaces extend in a direction set at an oblique angle to at least one of the inner ring axis or the outer ring axis.

12. The torque coupling assembly of claim 5, wherein the additional superhard contact elements are positioned such that a majority of the superhard contact surfaces extend in a direction that is substantially perpendicular to at least one of the inner ring axis or the outer ring axis.

13. The torque coupling assembly of claim 12, wherein the additional superhard contact elements secure the inner support ring in a fixed position relative to the outer support ring.

14. The torque coupling assembly of claim 5, wherein at least some of the superhard contact elements and the additional superhard contact elements comprise at least one of polycrystalline diamond, a carbide material, or a nitride material.

15. The torque coupling assembly of claim 5, wherein the superhard contact surfaces of at least some of the superhard contact elements and the additional superhard contact elements comprise one or more of a substantially planar surface, a partially convex spherical surface, a partially concave spherical surface, a partially convex substantially cylindrical surface, or a partially concave substantially cylindrical surface.

16. A rotary motion system, comprising:
a shaft;
a rotational energy device configured to apply torque to the shaft in order to rotate the shaft; and
at least one force coupling assembly comprising the torque coupling assembly of claim 1 operably coupled to the shaft and another component, the at least one force coupling assembly configured to transfer at least some of the torque applied to the shaft by the rotational energy device to the another component of the system via the at least one force coupling assembly, the at least one force coupling assembly further configured to receive a thrust force via the shaft or the another component with the one or more thrust bearing elements.

17. The rotary motion system of claim 16, wherein the rotary motion system comprises a subterranean drilling system with the shaft being coupled to the another component comprising a downhole tool.

18. A method of transferring one or more torque between components of a rotating system, the method comprising:
applying a torque to a shaft in order to rotate the shaft about an axis of rotation;
transferring the torque to another component coupled to the shaft with a torque coupling assembly, the transferring the torque comprising:
applying the torque through a first ring coupled to the shaft, the first ring having one or more superhard coupling elements coupled to the first ring; and
transferring the torque from the first ring through the one or more superhard coupling elements coupled to the first ring to one or more superhard coupling elements coupled to a second ring that is coupled to the another component;
rotating the another component with the torque; and
supporting a thrust force applied between the first ring and the second ring with one or more additional superhard coupling elements.

19. The method of claim 18, further comprising tilting the first ring relative to the second ring while at least some of the one or more superhard coupling elements and the one or more additional superhard coupling elements remain in contact with one another.

20. The method of claim 18, further comprising passing the thrust force through a first contact surface of the one or more additional superhard coupling elements that is in contact with a second contact surface of the one or more additional superhard coupling elements, the first contact surface and the second contact surface being positioned in a direction transverse to the axis of rotation.

* * * * *